US012794989B2

(12) United States Patent
Zhang et al.

(10) Patent No.: US 12,794,989 B2
(45) Date of Patent: Nov. 10, 2026

(54) DATA CENTER CLUSTER ARCHITECTURE

(71) Applicant: Intel Products IP LLC, Santa Clara, CA (US)

(72) Inventors: Kefei Zhang, Shanghai (CN); Zhihao Xie, Shanghai (CN); Haifeng Gong, Shanghai (CN); Fusheng Zhao, Shanghai (CN)

(73) Assignee: Intel Products IP LLC, Santa Clara, CA (US)

( * ) Notice: Subject to any disclaimer, the term of this patent is extended or adjusted under 35 U.S.C. 154(b) by 36 days.

(21) Appl. No.: 17/733,625

(22) Filed: Apr. 29, 2022

(65) Prior Publication Data

US 2022/0263913 A1 Aug. 18, 2022

(30) Foreign Application Priority Data

Apr. 1, 2022 (WO) ................ PCT/CN2022/084909

(51) Int. Cl.
*H04L 67/2866* (2022.01)
*G06F 3/06* (2006.01)

(52) U.S. Cl.
CPC ........ *H04L 67/2866* (2013.01); *G06F 3/0604* (2013.01); *G06F 3/0659* (2013.01); *G06F 3/0679* (2013.01)

(58) Field of Classification Search
CPC . H04L 67/2866; G06F 3/0604; G06F 3/0659; G06F 3/0679
See application file for complete search history.

(56) References Cited

U.S. PATENT DOCUMENTS

| | | | | |
|---|---|---|---|---|
| 12,259,817 | B2 * | 3/2025 | Choe | G06F 13/28 |
| 2019/0095363 | A1 | 3/2019 | Agarwal et al. | |
| 2020/0192798 | A1 * | 6/2020 | Natu | G06F 11/1004 |
| 2020/0278733 | A1 | 9/2020 | Li et al. | |
| 2020/0327084 | A1 | 10/2020 | Choudhary et al. | |
| 2022/0254390 | A1 * | 8/2022 | Gans | H03K 19/20 |

* cited by examiner

*Primary Examiner* — Emmanuel L Moise
*Assistant Examiner* — Xiang Yu
(74) *Attorney, Agent, or Firm* — Alliance IP, LLC

(57) ABSTRACT

A data center cluster includes a plurality of host systems coupled to a network processing device by a Compute Express Link (CXL) switch, where the network processing device includes memory to implement a memory pool for the data center cluster. Request and responses are communicated within the data center cluster using the memory pool and the network processing device manages communication within the data center cluster.

20 Claims, 15 Drawing Sheets

800

DATA CENTER CLUSTER ARCHITECTURE

CROSS REFERENCE TO RELATED APPLICATIONS

This application claims the benefit of priority under 35 U.S.C. § 119(b) to PCT International Application Serial No. PCT/CN2022/084909 filed on Apr. 1, 2022 and entitled DATA CENTER CLUSTER ARCHITECTURE. The prior application is hereby incorporated by reference in its entirety.

FIELD

The present disclosure relates in general to the field of distributed computing systems, and more specifically, to data transfers within data center clusters.

BACKGROUND

A datacenter may include one or more platforms each comprising at least one processor and associated memory modules. Each platform of the datacenter may facilitate the performance of any suitable number of processes associated with various applications running on the platform. These processes may be performed by the processors and other associated logic of the platforms. Each platform may additionally include I/O controllers, such as network adapter devices, which may be used to send and receive data on a network for use by the various applications.

BRIEF DESCRIPTION OF THE DRAWINGS

Like reference numbers and designations in the various drawings indicate like elements.

DETAILED DESCRIPTION

Figure 1:
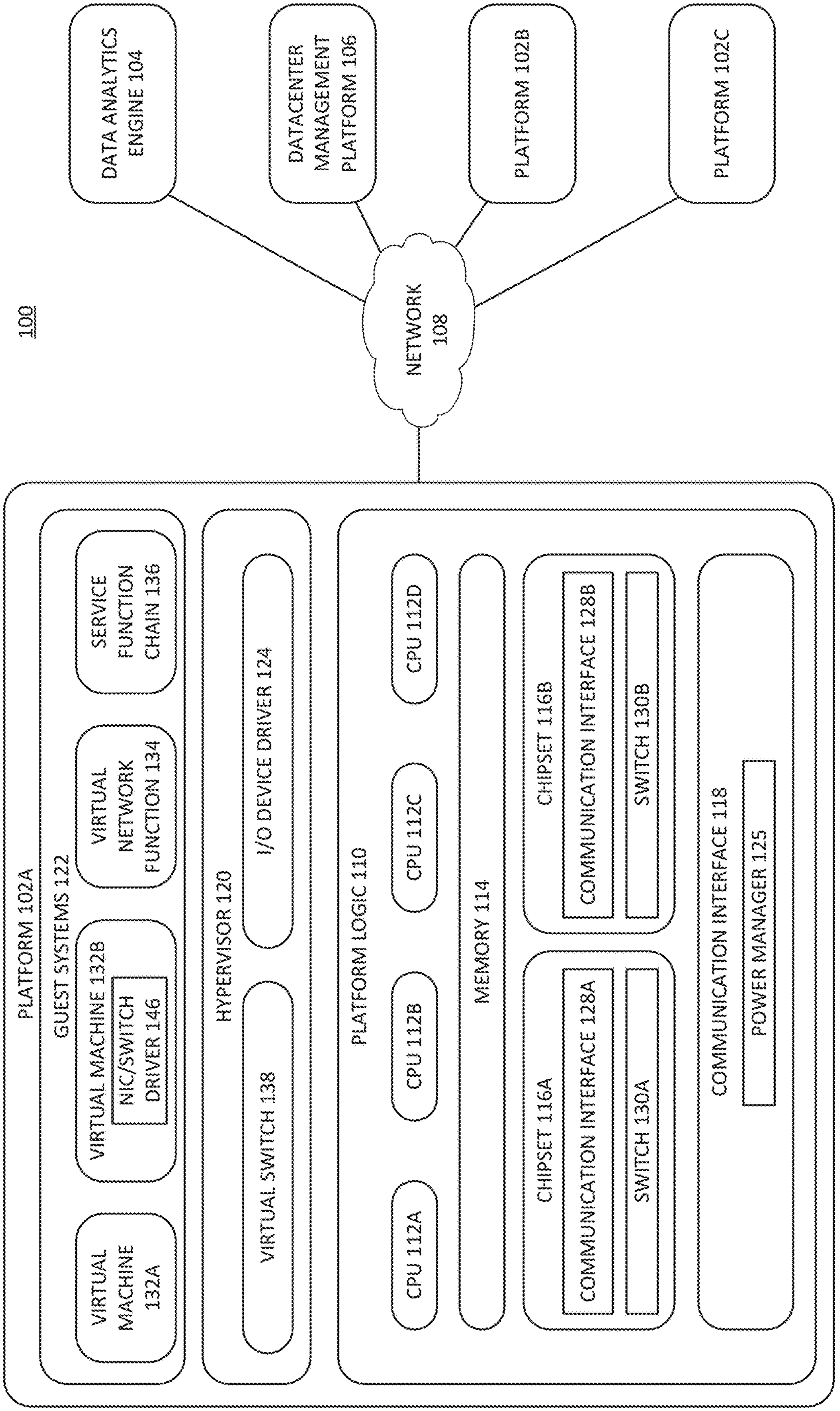
FIG. 1 illustrates a block diagram of components of a datacenter in accordance with certain embodiments.

FIG. 1 illustrates a block diagram of components of a datacenter 100 in accordance with certain embodiments. In the embodiment depicted, datacenter 100 includes a plurality of platforms 102, data analytics engine 104, and datacenter management platform 106 coupled together through network 108. A platform 102 may include platform logic 110 with one or more central processing units (CPUs) 112, memories 114 (which may include any number of different modules), chipsets 116, communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications. The platform may be logically or physically subdivided into clusters and these clusters may be enhanced through specialized networking accelerators and the use of Compute Express Link (CXL) memory semantics to make such cluster more efficient, among other example enhancements.

Each platform 102 may include platform logic 110. Platform logic 110 comprises, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, compossible servers, disaggregated servers, or other suitable structures that comprises multiple platforms coupled together through network 108 (which may comprise, e.g., a rack or backplane switch).

CPUs 112 may each comprise any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removeably coupled to platform 102. Although four CPUs are shown, a platform 102 may include any suitable number of CPUs.

Memory 114 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long-term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also comprise storage for instructions that may be executed by the cores of CPUs 112 or other processing elements (e.g., logic resident on chipsets 116) to provide functionality associated with components of platform logic 110. Additionally or alternatively, chipsets 116 may each comprise memory that may have any of the characteristics described herein with respect to memory 114. Memory 114 may also store the results and/or intermediate results of the various calculations and determinations performed by CPUs 112 or processing elements on chipsets 116. In various embodiments, memory 114 may comprise one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 comprising any suitable logic to support the operation of the CPUs 112. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via integrated I/O controllers resident on each CPU.

Chipsets 116 may each include one or more communication interfaces 128. Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 may be implemented through one or more I/O controllers, such as one or more physical network interface controllers (NICs), also known as network interface cards or network adapters. An I/O controller may include electronic circuitry to communicate using any suitable physical layer and data link layer standard such as Ethernet (e.g., as defined by an IEEE 802.3 standard), Fibre Channel, InfiniBand, Wi-Fi, or other suitable standard. An I/O controller may include one or more physical ports that may couple to a cable (e.g., an Ethernet cable). An I/O controller may enable communication between any suitable element of chipset 116 (e.g., switch 130) and another device coupled to network 108. In some embodiments, network 108 may comprise a switch with bridging and/or routing functions that is external to the platform 102 and operable to couple various I/O controllers (e.g., NICs) distributed throughout the datacenter 100 (e.g., on different platforms) to each other. In various embodiments an I/O controller may be integrated with the chipset (i.e., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 according to one or more link or interconnect protocols, such as Peripheral Component Interconnect Express (PCIe), Compute Express Link (CXL), HyperTransport, GenZ, OpenCAPI, and others, which may each alternatively or collectively apply the general principles and/or specific features discussed herein. Switch 130 may be a physical or virtual (i.e., software) switch.

Platform logic 110 may include an additional communication interface 118. Similar to communication interface 128, communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 comprises one or more physical I/O controllers (e.g., NICs). These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112). Further, as discussed herein, I/O controllers may include a power manager 125 to implement power consumption management functionality at the I/O controller (e.g., by automatically implementing power savings at one or more interfaces of the communication interface 118 (e.g., a PCIe interface coupling a NIC to another element of the system), among other example features.

Platform logic 110 may receive and perform any suitable types of processing requests. A processing request may include any request to utilize one or more resources of platform logic 110, such as one or more cores or associated logic. For example, a processing request may comprise a processor core interrupt; a request to instantiate a software component, such as an I/O device driver 124 or virtual machine 132; a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may comprise a single virtual machine (e.g., virtual machine 132*a* or 132*b*) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132*b* may be paravirtualized. For example, the virtual machine 132*b* may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may comprise a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining may provide the ability to define an ordered list of network services (e.g. firewalls, load balancers) that are stitched together in the network to create a service chain.

A hypervisor 120 (also known as a virtual machine monitor) may comprise logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may comprise a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may comprise a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the data system 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, guest systems 122 may communicate with nodes that are external to the datacenter 100 through network 108.

Figure 2A:
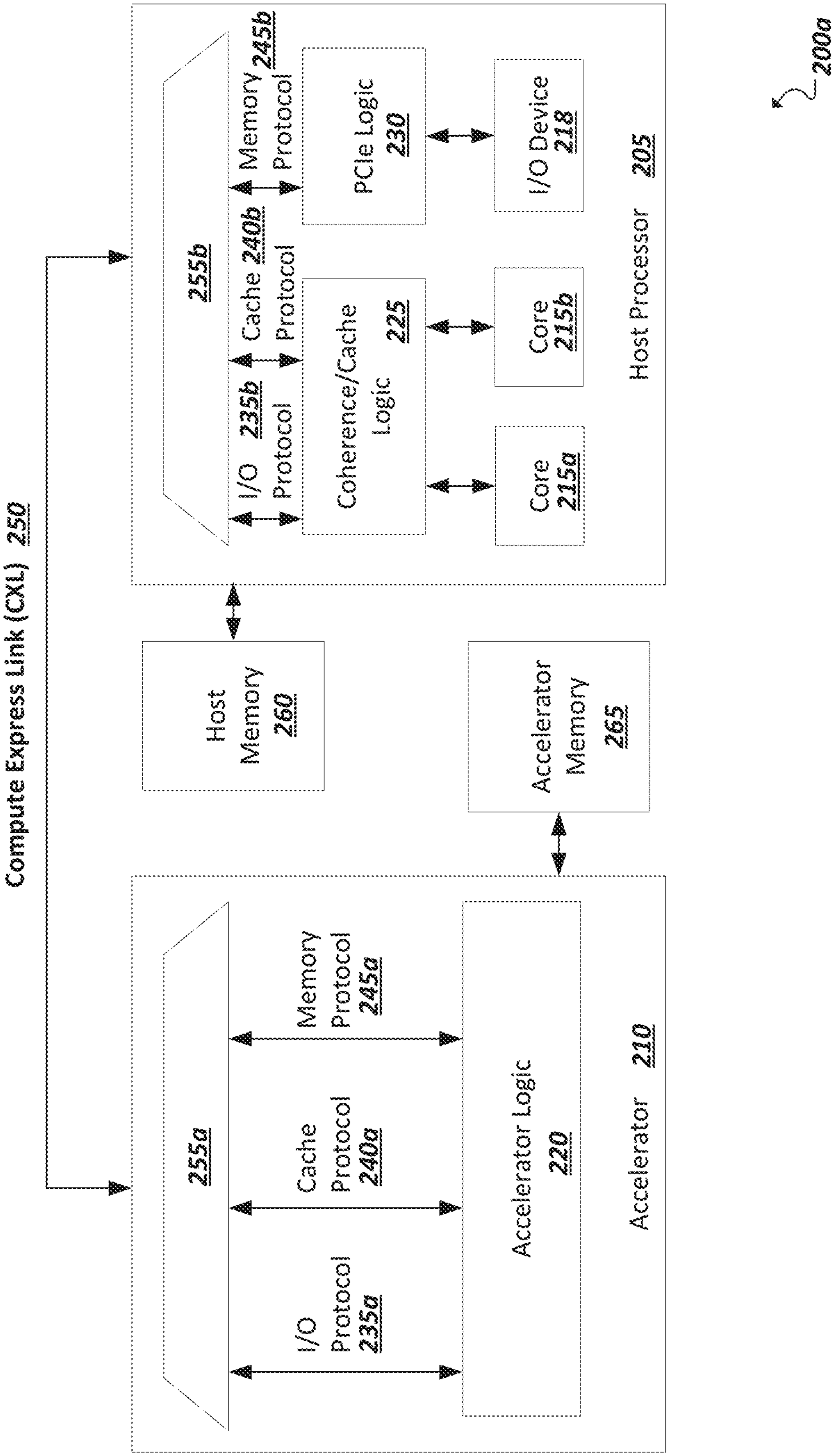
FIG. 2A illustrates a simplified block diagram of an example computing system utilizing a link compliant with a Compute Express Link (CXL)-based protocol.
Figure 2B:
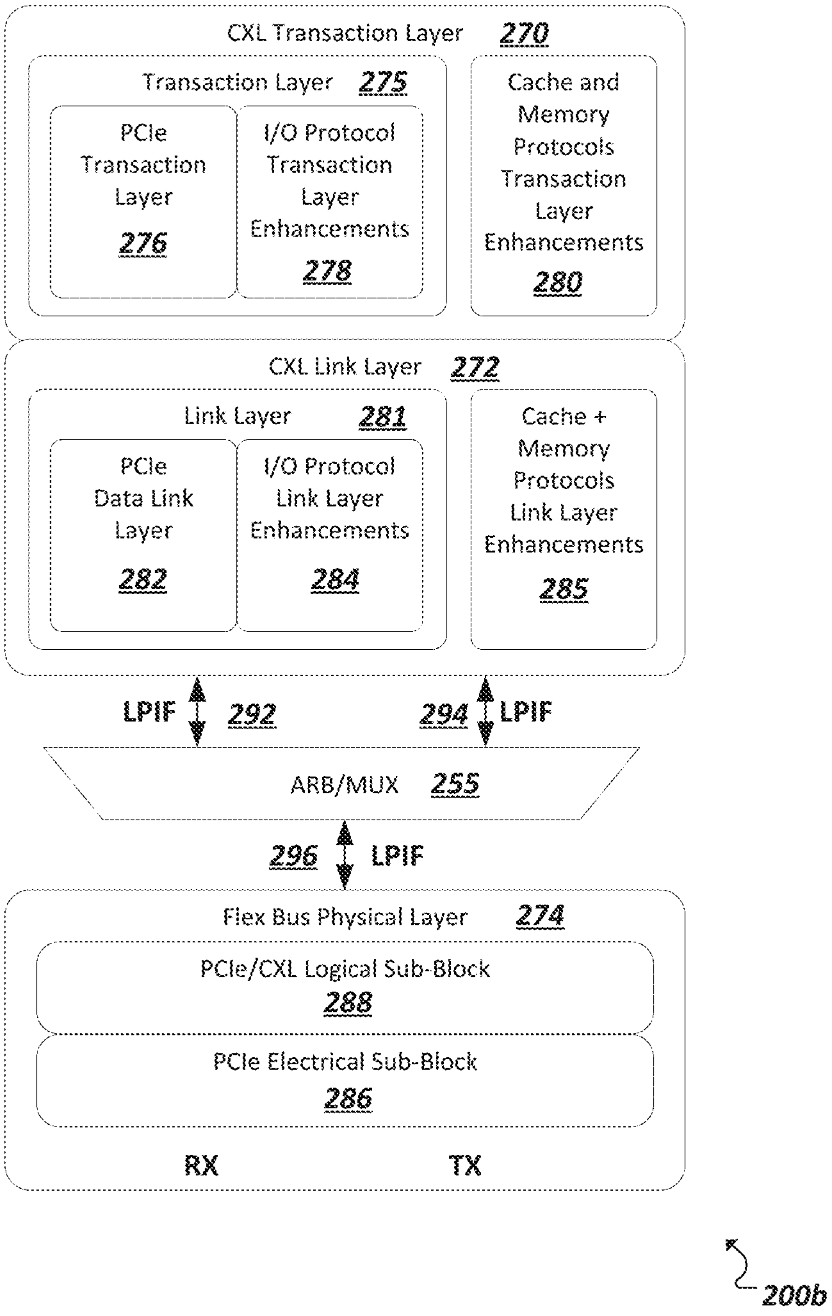
FIG. 2B illustrates a simplified block diagram of example protocol circuitry.

FIGS. 2A-2B are simplified block diagrams illustrating example protocol logic, implemented in hardware and/or software, to implement a Compute Express Link (CXL) protocol. It should be appreciated, that while much of the discussion centers on features provided by a CXL-protocol and communication channels compliant with CXL, that other substitute protocols with similar, comparable features may be substituted for CXL in the embodiments discussed below. The CXL interconnect protocol is designed to provide an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, networking accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of sub-protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Turning to FIG. 2A, a simplified block diagram 200*a* is shown illustrating an example system utilizing a CXL link 250. For instance, the link 250 may interconnect a host processor 205 (e.g., CPU) to an accelerator device 210. In this example, the host processor 205 includes one or more processor cores (e.g., 215*a-b*) and one or more I/O devices (e.g., 218). Host memory (e.g., 260) may be provided with the host processor (e.g., on the same package or die). The accelerator device 210 may include accelerator logic 220 and, in some implementations, may include its own memory (e.g., accelerator memory 265). In this example, the host processor 205 may include circuitry to implement coherence/cache logic 225 and interconnect logic (e.g., PCIe logic 230). CXL multiplexing logic (e.g., 255*a-b*) may also be provided to enable multiplexing of CXL protocols (e.g., I/O protocol 235*a-b* (e.g., CXL.io), caching protocol 240*a-b* (e.g., CXL.cache), and memory access protocol 245*a-b* (CXL.mem)), thereby enabling data of any one of the supported protocols (e.g., 235*a-b*, 240*a-b*, 245*a-b*) to be sent, in a multiplexed manner, over the link 250 between host processor 705 and accelerator device 210.

In some implementations, a Flex Bus port may be utilized in concert with CXL-compliant links to flexibly adapt a device to interconnect with a wide variety of other devices (e.g., other processor devices, accelerators, switches, memory devices (e.g., near memory, far memory, pooled memory, tiered memory, cache, etc.), among other examples). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

FIG. 2B is a simplified block diagram 200*b* illustrating an example protocol stack and associated logic (implemented in hardware and/or software) utilized to implement CXL links. For instance, the protocol logic may be organized as multiple layers to implement the multiple protocols supported by the port. For instance, a port may include transaction layer logic (e.g., 270), link layer logic (e.g., 272), and physical layer logic (e.g., 274) (e.g., implemented all or in-part in circuitry). For instance, a transaction (or protocol) layer (e.g., 270) may be subdivided into transaction layer logic 275 that implements a PCIe transaction layer 276 and CXL transaction layer enhancements 278 (for CXL.io) of a base PCIe transaction layer 276, and logic 280 to implement cache (e.g., CXL.cache) and memory (e.g., CXL.mem) protocols for a CXL link. Similarly, link layer logic 272 may be provided to implement a base PCIe data link layer 282 and a CXL link layer (for CXl.io) representing an enhanced version of the PCIe data link layer 284. A CXL link layer 272 may also include cache and memory link layer enhancement logic 285 (e.g., for CXL.cache and CXL.mem).

Continuing with the example of FIG. 2B, a CXL link layer logic 272 may interface with CXL arbitration/multiplexing (ARB/MUX) logic 255, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 274 based on a PCIe physical layer (e.g., PCIe electrical PHY 286). For instance, a Flex Bus physical layer may be implemented as a converged logical physical layer 288 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 272) to circuitry or other logic (e.g., an IP block or other hardware element) implementing at least a portion of a physical layer (e.g., 274) of a protocol. For instance, an interface based on a Logical PHY Interface (LPIF) specification to define a common interface between a link layer controller, module, or other logic and a module implementing a logical physical layer ("logical PHY" or "log PHY") to facilitate interoperability, design and validation re-use between one or more link layers and a physical layer for an interface to a physical interconnect, such as in the example of FIG. 2B. Additionally, as in the example of FIG. 2B, an interface may be implemented with logic (e.g., 281, 285) to simultaneously implement and support multiple protocols. Further, in such implementations, an arbitration and multiplexer layer (e.g., 255) may be provided between the link layer (e.g., 272) and the physical layer (e.g., 274). In some implementations, each block (e.g., 255, 274, 281, 285) in the multiple protocol implementation may interface with the other block via an independent LPIF interface (e.g., 292, 294, 296). In cases where bifurcation is supported, each bifurcated port may likewise have its own independent LPIF interface, among other examples.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

Data centers and data center networks continue to grow in prevalence and performance capabilities as cloud computing and other distributed computing architectures and systems grow in prevalence. With data center network speeds reaching 100 Gps and continuing to increase, conventional communication protocols may not be able to keep pace. For instance, the transmission control protocol (TCP) cannot provide the performance that cloud service providers need or desire to provide their respective services (e.g., infrastructure as a service (IaaS), software as a service (SaaS), platform as a service (PaaS), etc.). For instance, TCP is not generally suited for latency sensitive processing due to its congestion management and retransmission control features. Further, data movement between memory, processors, and I/O devices struggle to meet the demands of memory intensive applications using TCP—the so called "memory wall" problem.

In some implementations, the memory wall problem and other example issues may be overcome, for instance, by bypassing the TCP stack in the kernel by causing data to pass through from the I/O directly to the user application. For instance, high performance reliable messaging or remote direct memory access (RDMA)-like services, among other example solutions may be utilized. In RDMA solution, small caches of connection and RDMA permission states may be implemented and maintained, with such implementations relying on long-lived memory pinning and I/O page tables, among other features. This, however, can lead to RDMA solutions implementing caps or ceilings on the number of static connections. Such caps, however, limits RDMA implementations' potential for performance improvements, in particular in scenarios where a system relies on large scale short connections, among other example issues.

In an improved system implementation, a data center cluster may be implemented utilizing the CXL-based communication channels. For instance, a CXL-based data center cluster may include a number of host computers coupled to a CXL-based switch. Traffic within the cluster and between clusters may be implemented utilizing a network processor device (e.g., a smart network interface controller (NIC), data processing unit (DPU), infrastructure processing unit (IPU), programmable networking device, etc.), which is connected to the CXL-based switch. Local memory of the network processor device may be utilized to construct a shared memory pool for the cluster, which can be leveraged to facilitate efficient data transfers utilizing CXL. CXL enables a more efficient data transmission than TCP and RDMA between all the processors and accelerators of the cluster. The network processor device may be configured with logic (implemented in hardware, firmware, and/or software) to perform near-data processing for the cluster and reduce the memory movement, to thereby provide more efficient performance in an improved service mesh cluster architecture. Such an architecture can be used to implement data center clusters with reduced memory movement between hosts, lower latency, improved resource utilization, and lower power consumption, among other example benefits.

Figure 3:
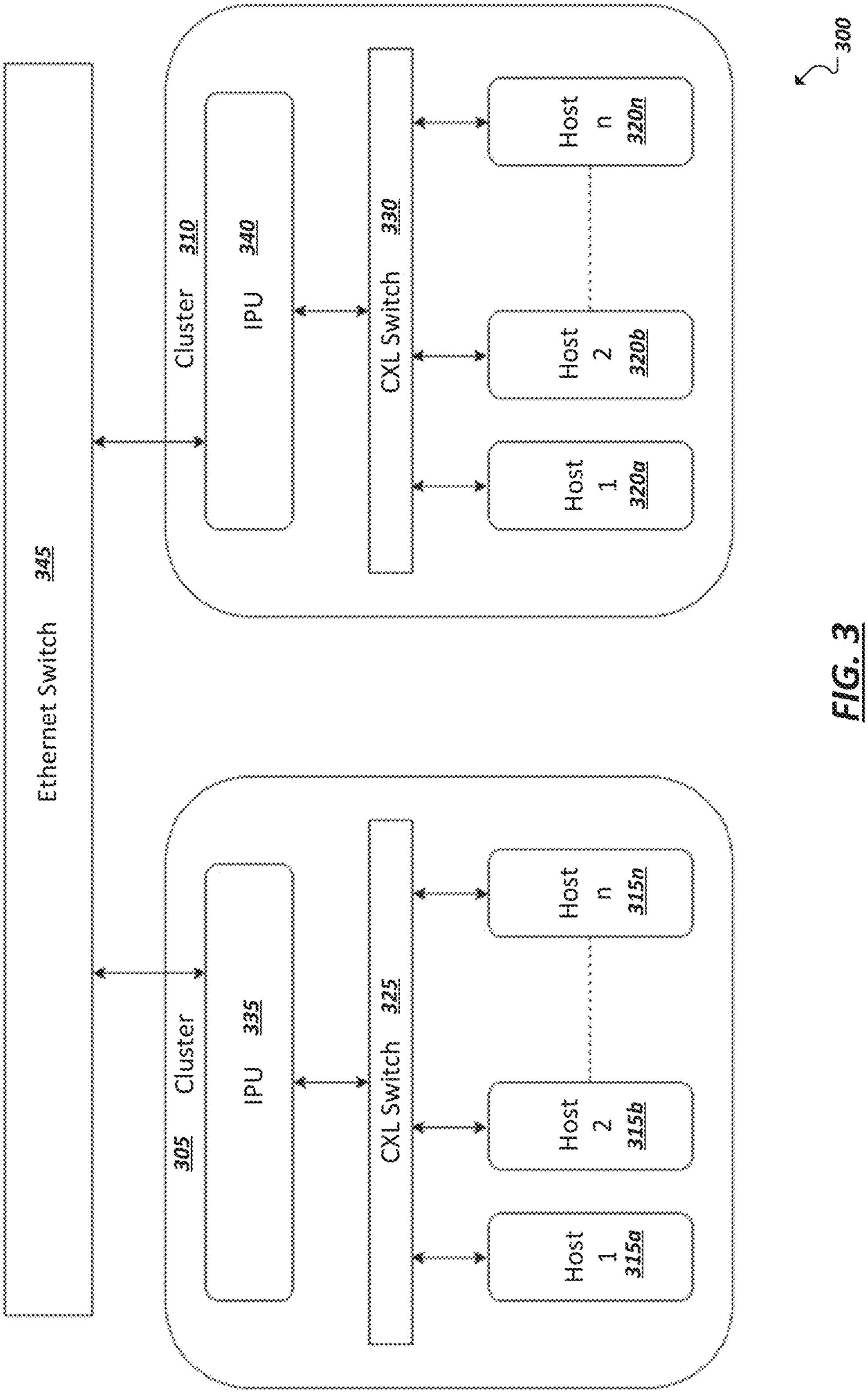
FIG. 3 is a simplified block diagram illustrating an example data center cluster.

FIG. 3 is a simplified block diagram 300 illustrating an example implementation of an improved data center cluster architecture. In this example, clusters 305, 310 are shown, each implemented to include respective host computing devices (e.g., 315*a-n*, 320*a-n*) coupled to a switch 325, 330 in the cluster 305, 310. Each cluster 305, 310 may further include a network processing device (e.g., an IPU or smart NIC) 335, 340 to manage the corresponding cluster (e.g., 305, 310). Further, the network processing devices (e.g., 335, 340) of the various clusters (e.g., 305, 310) may be interconnected with other network processing devices of other clusters, for instance, using an Ethernet or other interconnect. For instance, one or more switches (e.g., Ethernet switch 345) may be utilized to facilitate such an inter-cluster network.

As shown in the example of FIG. 3, a single service mesh cluster (e.g., 305) may be equipped with a CXL switch 325 and network processing device 335, and all the servers (e.g., hosts 315*a-n*) belonging to this cluster are connected to the CXL switch 325 and network processing device 335. The scalability of host servers may vary from cluster to cluster, with clusters capable of including various numbers of host server system based on the dimensions of the CXL switch (e.g., implemented as one rack of servers or multiple racks, etc.). A service mesh may be composed of one cluster or multiple interconnected clusters, such as illustrated in the example of FIG. 3. Cross-cluster connections are managed by the network processing device through the inter-cluster switch (e.g., 345). Additionally, the cluster's network processing device (e.g., 335, 340) may be additionally tasked with handling all the ingress and egress traffic of the cluster and distribute the requests between each host server (e.g., 315*a-n*) inside the cluster (e.g., 305).

Figure 4:
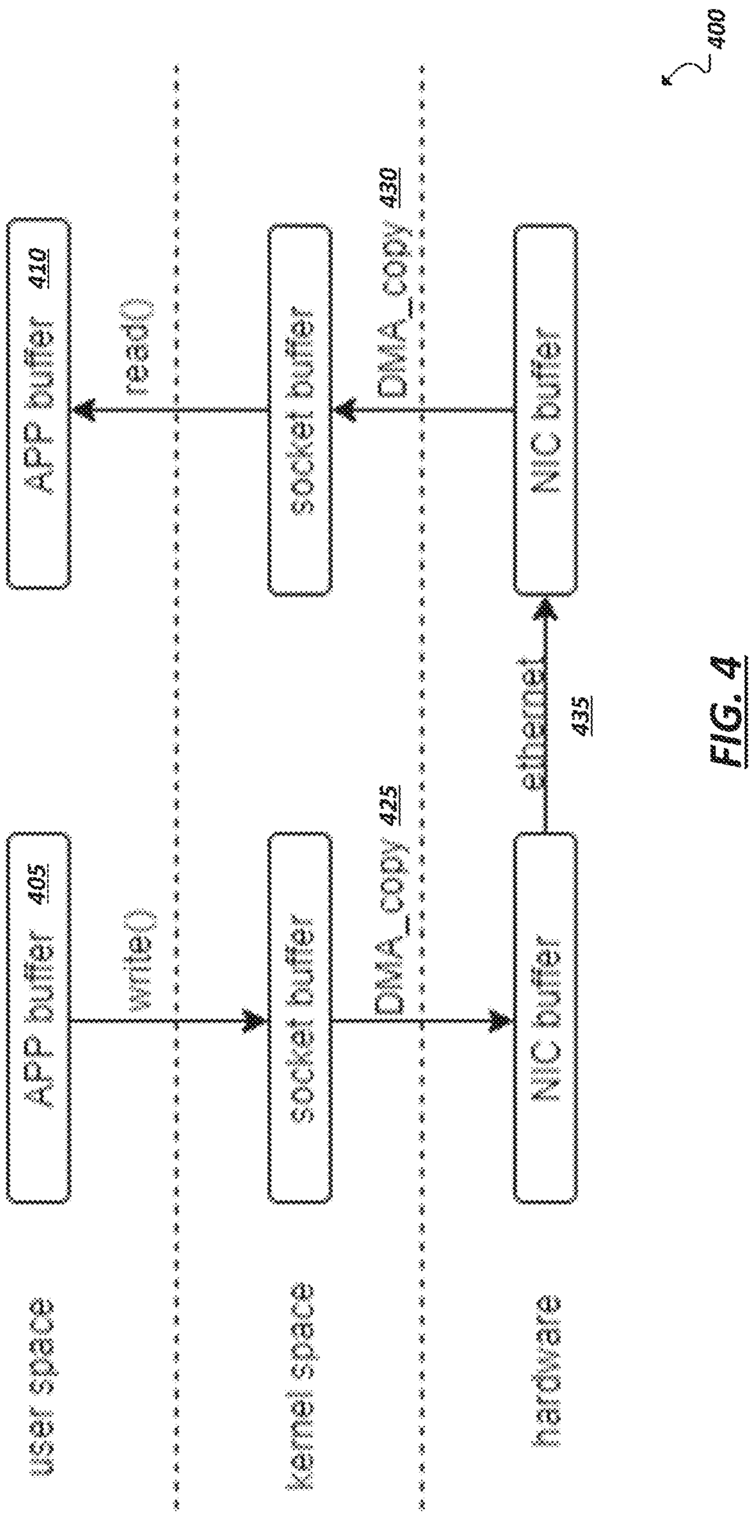
FIG. 4 is a simplified block diagram illustrating example data transfers using Transport Control Protocol (TCP).

As introduced above, constructing data center or service mesh clusters using CXL interconnects and switches may present performance advantages over traditional technologies. For instance, as shown in the simplified block diagram 400 of FIG. 4, an example of data transmission using TCP within a data center cluster is illustrated. In TCP, normal data transmission from application 405 to another 410 proceeds through the kernel stack, resulting the transmission containing two memory copies, two direct memory access (DMA) copies (e.g., 425, 430), and four instances of context switching, not to mention the network transfer over Ethernet 435. While, for TCP in a data center, best-case round-trip latency could be as fast as 25 us, the latency outliers under congestion (or link faults) can be anywhere between 50 ms and several seconds, even when alternative non-congested network paths are available, to say nothing of operating system delays.

Figure 5:
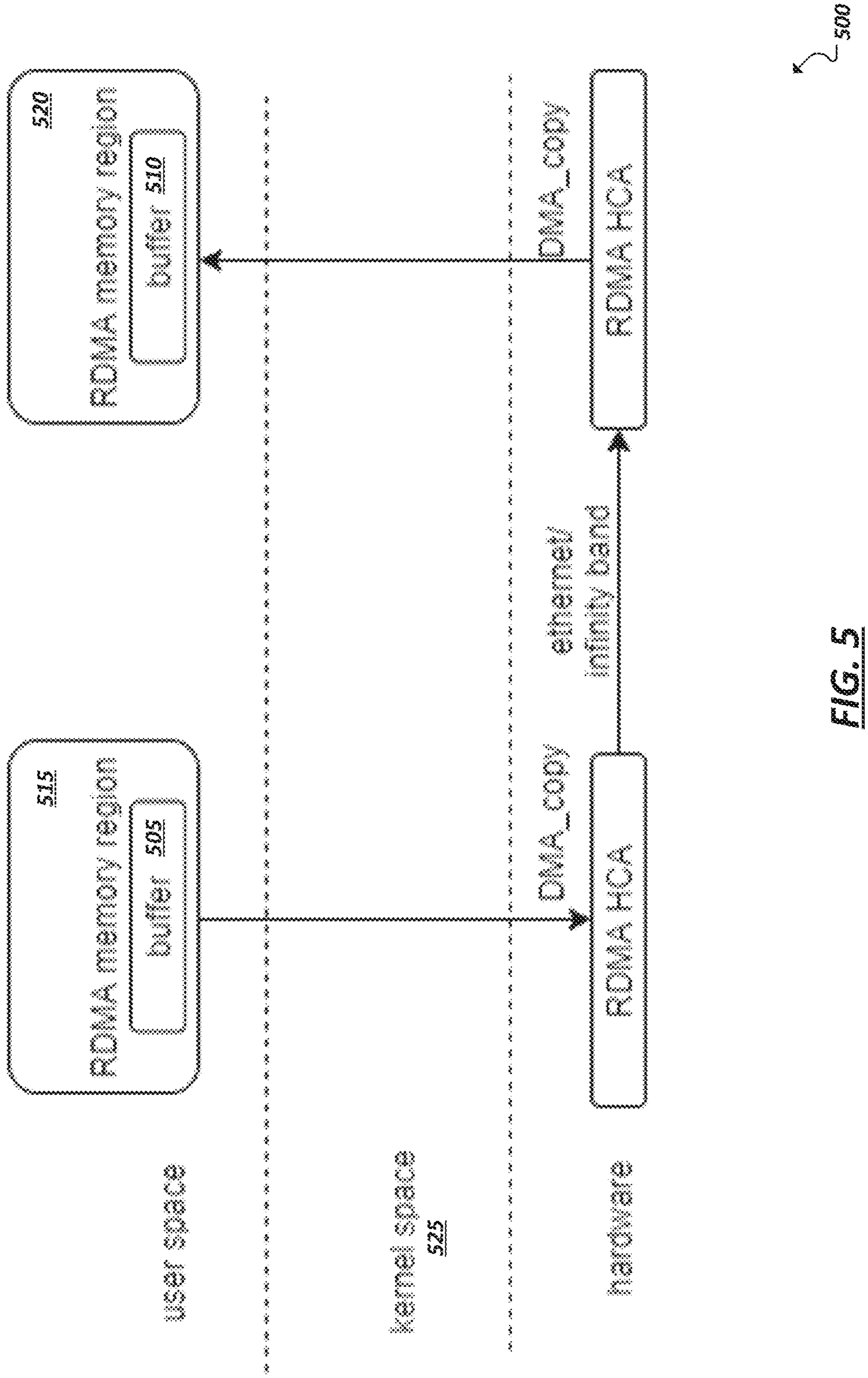
FIG. 5 is a simplified block diagram illustrating example data transfers using Remote Direct Memory Access (RDMA).

Further, turning to the simplified block diagram 500 of FIG. 5, an example of RDMA data transmission within a data center cluster is illustrated. In an RDMA data transfer, an RDMA driver allocates and registers a memory region for the RDMA Host Channel Adapter (HCA), which is normally a RDMA NIC. In RDMA, all the send/receive buffers (e.g., 505, 510) live in the memory region (e.g., 515, 520), with one DMA occurring when the buffer is moved between memory region and hardware. While current cloud service providers utilize RDMA-like solutions, suggesting that zero-copy and bypassing the kernel space (e.g., 525) are promising strategies, RDMA is nonetheless limited. go. For instance, in RDMA, the memory buffer in the region needs to be pre-allocated for every RDMA connection. Moreover, the performance of connection establishment is not as good as TCP. More preferably, connections should be longer in durations so that the memory and I/O page tables can be pinned. In this respect, RDMA is less suitable for large scale dynamic connections.

Figure 6:
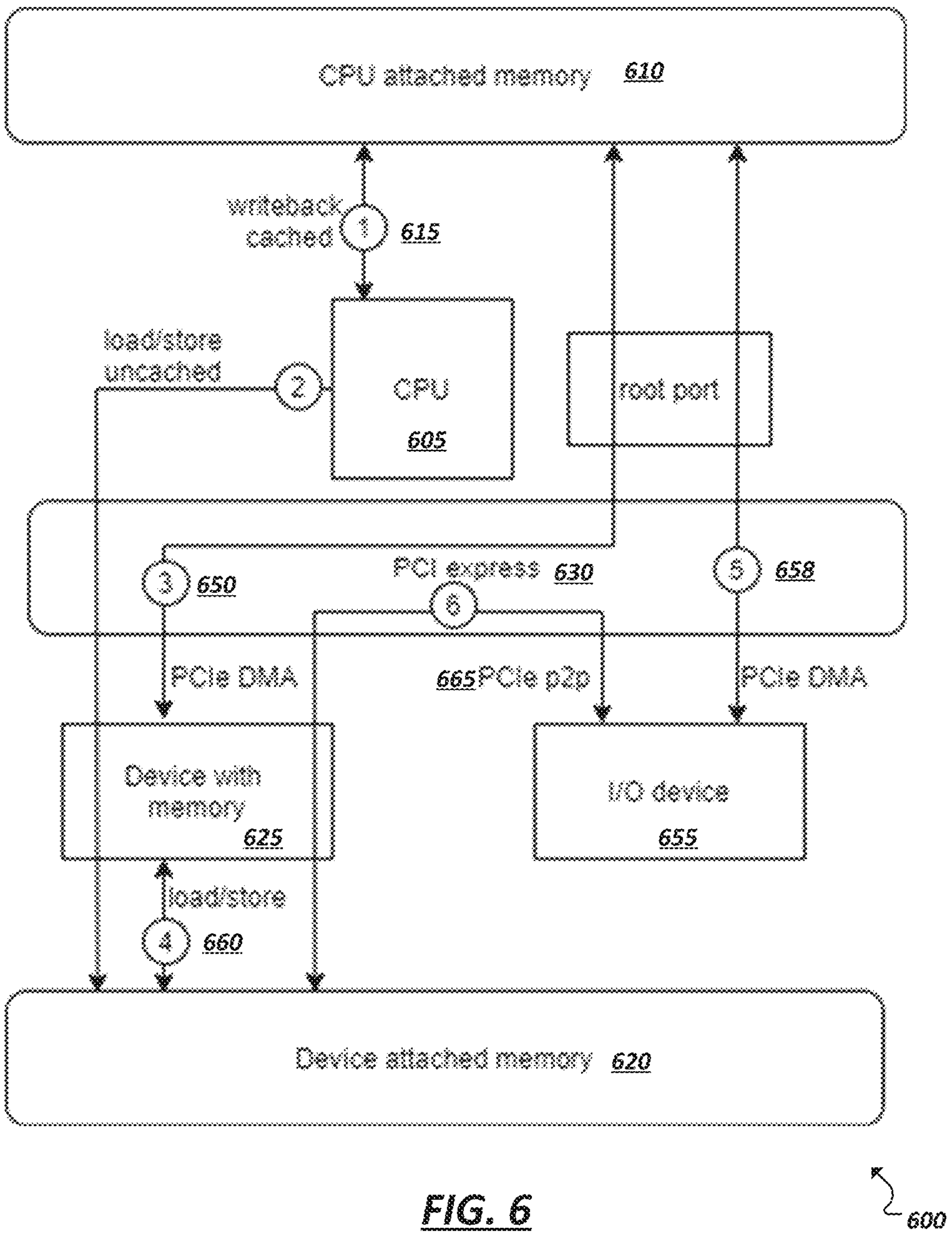
FIG. 6 is a simplified block diagram illustrating example data transfers using Peripheral Component Interconnect Express (PCIe).

Turning to the simplified block diagram 600 of FIG. 6, an example data transfer is shown utilizing PCIe DMA within a data center cluster. In this example, when a CPU 605 is to access its attached memory 610, it can simply cache the data, access the data from its cache, and continue accessing this data as many times as is called for, later writing-back any data that the CPU has updated (e.g., at 615). If the CPU 605 is to access external memory (e.g., 620) of an attached device (e.g., 625), such as a PCIe-attached device (attached via a PCIe interconnect 630) mapped to the system as memory-mapped I/O (MMIO), the CPU 605 is unable to cache the data present in the attached memory 620. Instead, whenever the CPU 605 wants to access attached memory 620, the CPU performs an explicit load or store that goes across the link (e.g., 630) into the device (e.g., 625) and the device 625 will do the read or the write from or into the CPU 605 (e.g., at 635). As for access to the CPU-attached memory 610 by the attached device 625, the attached device 625 sends explicit read and write transactions (e.g., 650), also referred to as direct memory access (DMA) transactions. When an I/O device (e.g., 655) is perform a write 658, it sends a write on a PCI express link (e.g., 630), which is processed by a root port, which performs a protocol conversion so that the producer-consumer ordering model of the I/O device 655 is followed while, at the same time, satisfying any cache coherency model that exists in the CPU, among other examples. Further memory transactions within such PCIe-based architectures include the attached device 625 accessing (at 660) its own memory 620 using load/store semantics. The I/O device 655 may also access (at 665) the attached memory 620 using PCIe peer-to-peer (P2P) functionality.

The producer-consumer model utilized in PCIe-based architectures and other technologies works well for a wide range of I/O devices especially when performing bulk data transfer. An improved architecture would do well to incorporate similar features. Additionally, through the use of a network processing device, such as device with hardware accelerator logic to implement fine-grained sharing of the data with the processor. Building on the foundation of such accelerators, the traditional producer-consumer model may be augmented to allow for devices to be able to cache the system memory just like the CPU cores are able to do, among other example advantages.

Figure 7:
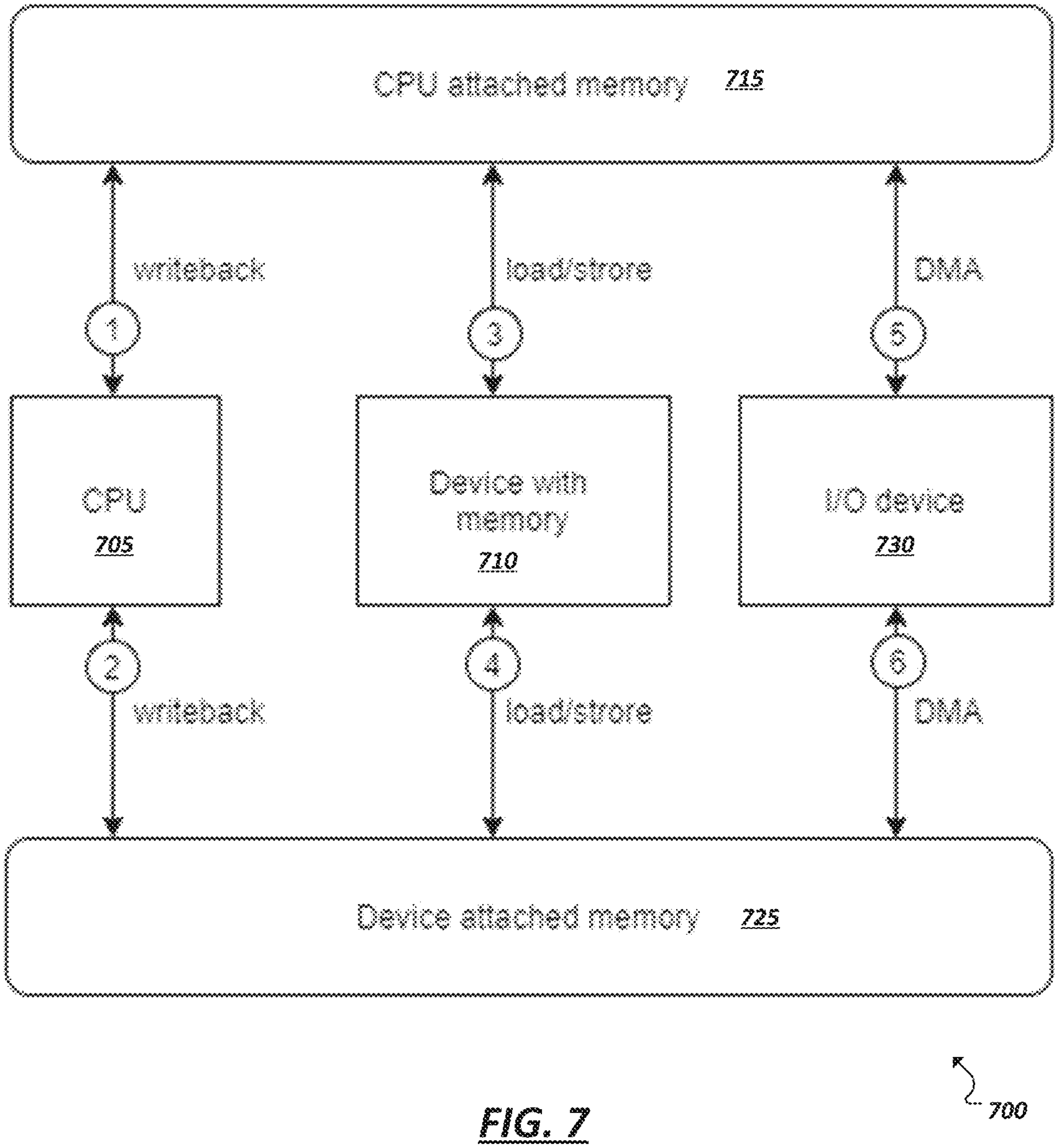
FIG. 7 is a simplified block diagram illustrating an improved memory access model for use in data center clusters.

Turning to FIG. 7, a simplified block diagram 700 is shown illustrating an improved memory access model implementable using an improved cluster architecture utilizing CXL, such as the example introduced in FIG. 3. In this memory access model, write-back memory and load/store semantics supported by protocols such as PCIe are extended, allowing devices (e.g., 710) the luxury of not needing to utilize DMA reads and writes to access memory (e.g., 715) attached to the CPU (e.g., 705). Instead, collaborative processing may be utilized allowing CPU-attached memory 715 and device-attached memory 725 to be effectively shared by the devices within a system (e.g., a cluster).

As introduced above, CXL technology is a breakthrough high-speed CPU-to-device interconnect, capable of maintaining memory coherency between the CPU memory space and memory on attached devices, so that any of the CPU cores or any of the other I/O devices (e.g., 730) configured to support CXL may utilize these attached memories and cache data locally on the same. Further, CXL allows resource sharing for higher performance, such that memory pooling may be achieved across different computing entities. Such CXL-enabled memory pools may enable enhanced and more efficient movement of operands. For instance, rather than utilizing DMA operation to transfer an entire segment of data from one computing element to the next computing element in association with a corresponding operation, coherent memory allows data to be moved seamlessly as if it were a simple transfer between the different cores in different CPU sockets. Such memory pooling can thus realize significant latency reduction and enable us to have this aggregated memory in the system. Such features can enable more efficient memory usage, reduced architectural complexity, and thereby lower overall system costs. Further, such features allows programmers and system developers to focus on target workloads as opposed to redundant memory management, among other example benefits.

Figure 8:
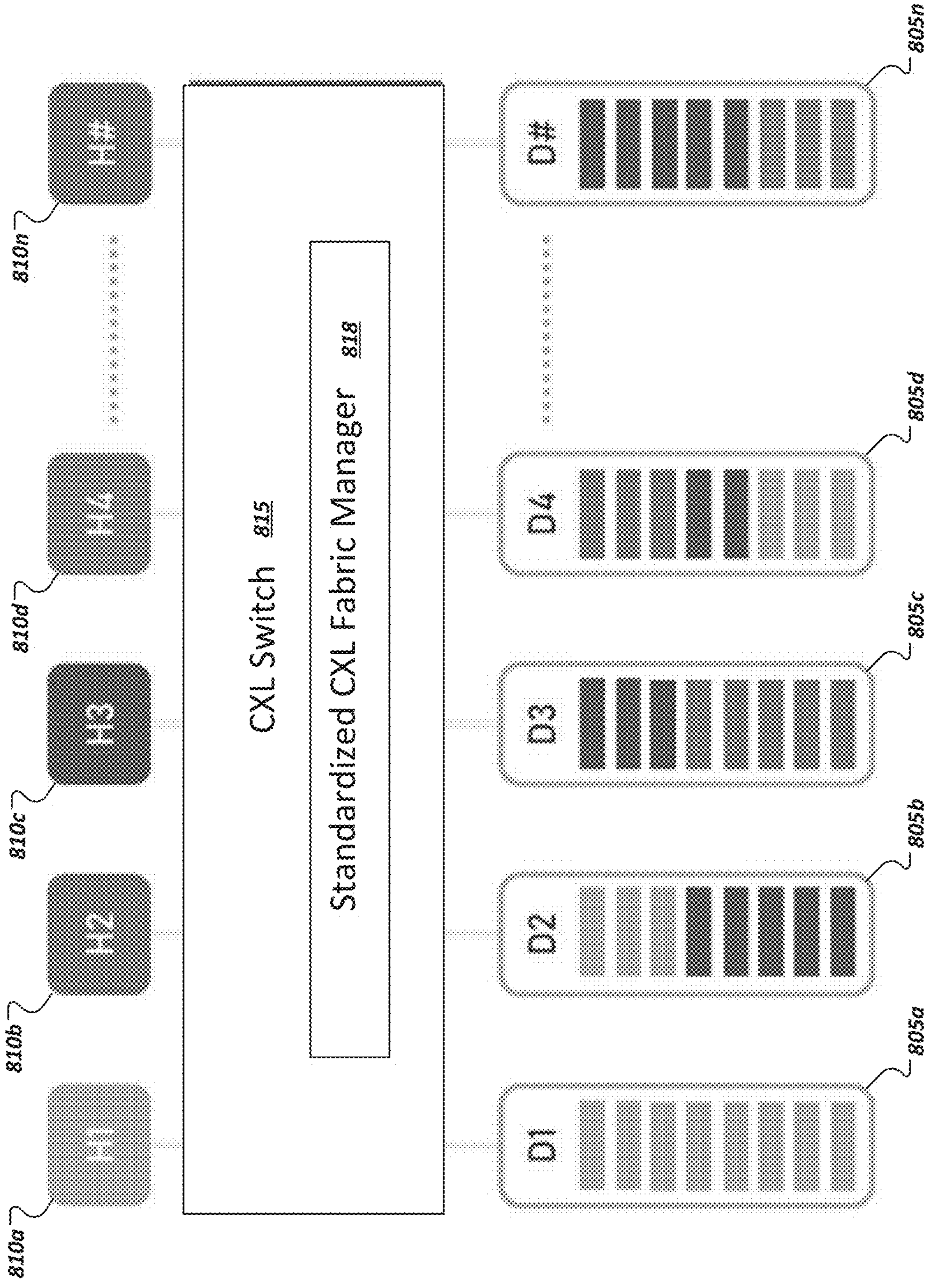
FIG. 8 is a simplified block diagram illustrating memory pooling using a Compute Express Link (CXL) protocol.

FIG. 8 is a simplified block diagram 800 illustrating the example pooling of multiple devices 805*a-n* (e.g., logical type 2 devices) to multiple host devices 810*a-m*. CXL (e.g., CXL 2.0) enables such pooling utilizing a CXL switch 815 (with a standardized CXL Fabric manager 818), where the memory on the devices 805*a-n* can be assigned to or shared with different hosts (e.g., 810*a-m*) and can be changed over time. The CXL switch 815 supports multiple hosts and is responsible for ensuring quality of service as well as isolation between different hosts. Other implementations, may utilize processing-in-memory (PIM) within their systems or cluster, including logic-in-memory or near-data processing. PIM technology aims to bring memory and computing closer instead of separating them, thus, improving the efficiency of data movement. Traditional PIM systems, however, may struggle with data coherence issues, as both a host processor and PIM processing can handle and compete for data, among other example issues.

Figure 9:
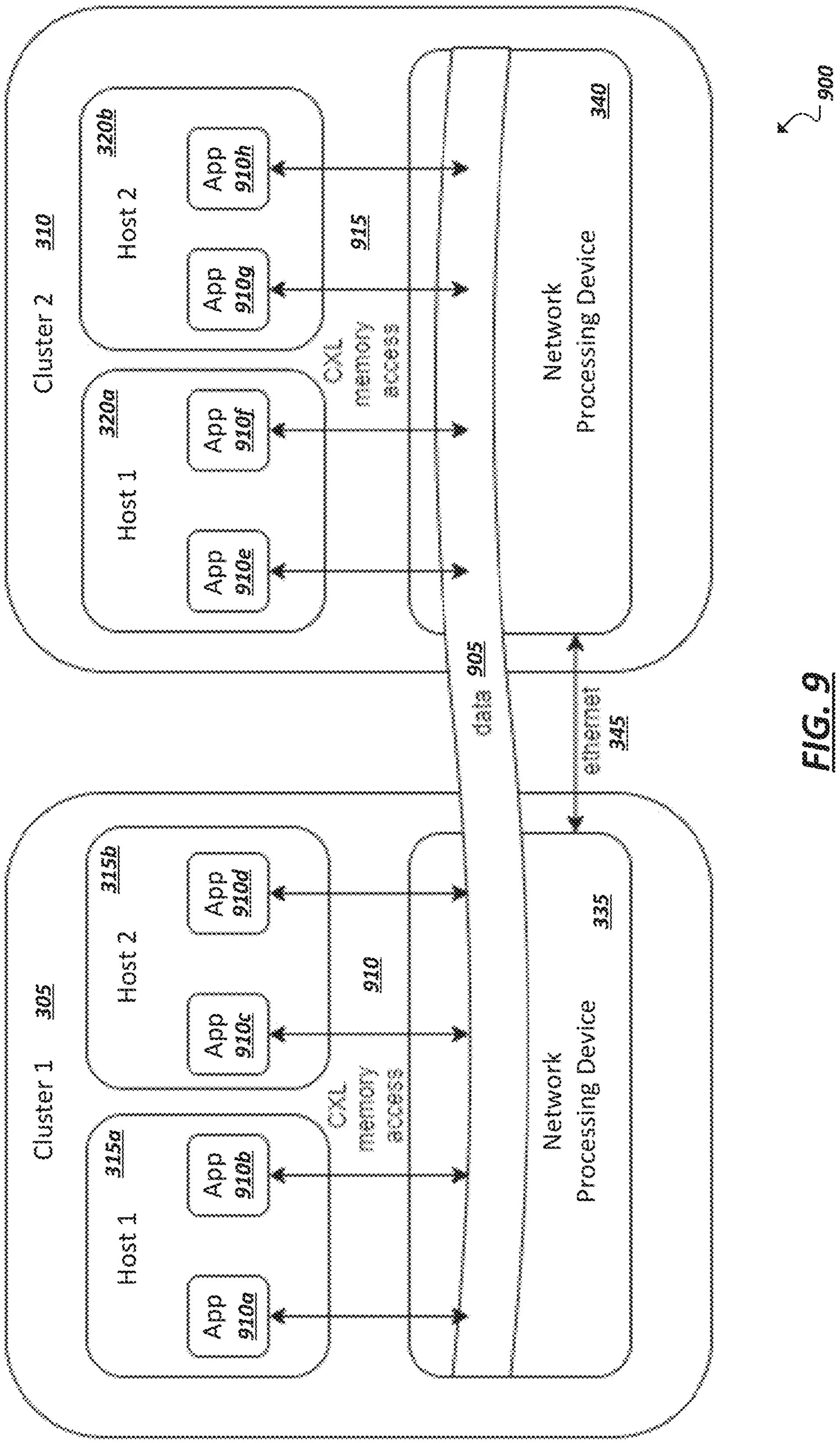
FIG. 9 is a simplified block diagram illustrating an example data center cluster architecture.

As introduced in the discussion of FIG. 3 above, an improved cluster architecture may leverage the combined features of CXL and smart network processing devices (e.g., IPUs) to develop more efficient and better-performing service mesh cluster, which achieve these efficiencies with minimal movement of networking data and enhanced near memory processing. Such improved clusters can realize smaller latency, better resources utilization, and lower power consumption, among other example benefits. FIG. 9 is a simplified block diagram 900 illustrating a logical view of such a portion of such an improved cluster (similar to the more general architectural representation of the improved cluster shown in FIG. 3). As introduced above, a service mesh can be composed of one or multiple clusters (e.g., 305, 310). Host devices (e.g., 315*a*, 315*b*, 320*a*, 320*b*, etc.) may each host various programs, services, or applications (e.g., 910*a-h*), which are executed on the corresponding host and which may share and operate various data on the service mesh. All of the data 905 moving within the cluster may be handled using the corresponding cluster's network processing device (e.g., 335, 340), with the network processing device further handling the inter-cluster communications and the internal connections of hosts and the network processing device within the cluster. Attached memory of the network processing device may be utilized to implement a memory pool for the cluster. Accordingly, data used in transactions within the cluster may be saved in the memory pool on the network processing device. Accordingly, when host device accesses the data within a transaction, the host device can utilize CXL memory accesses (e.g., 910, 915) to directly read or write data through the CXL cached memory as if it were local memory.

Figure 10:
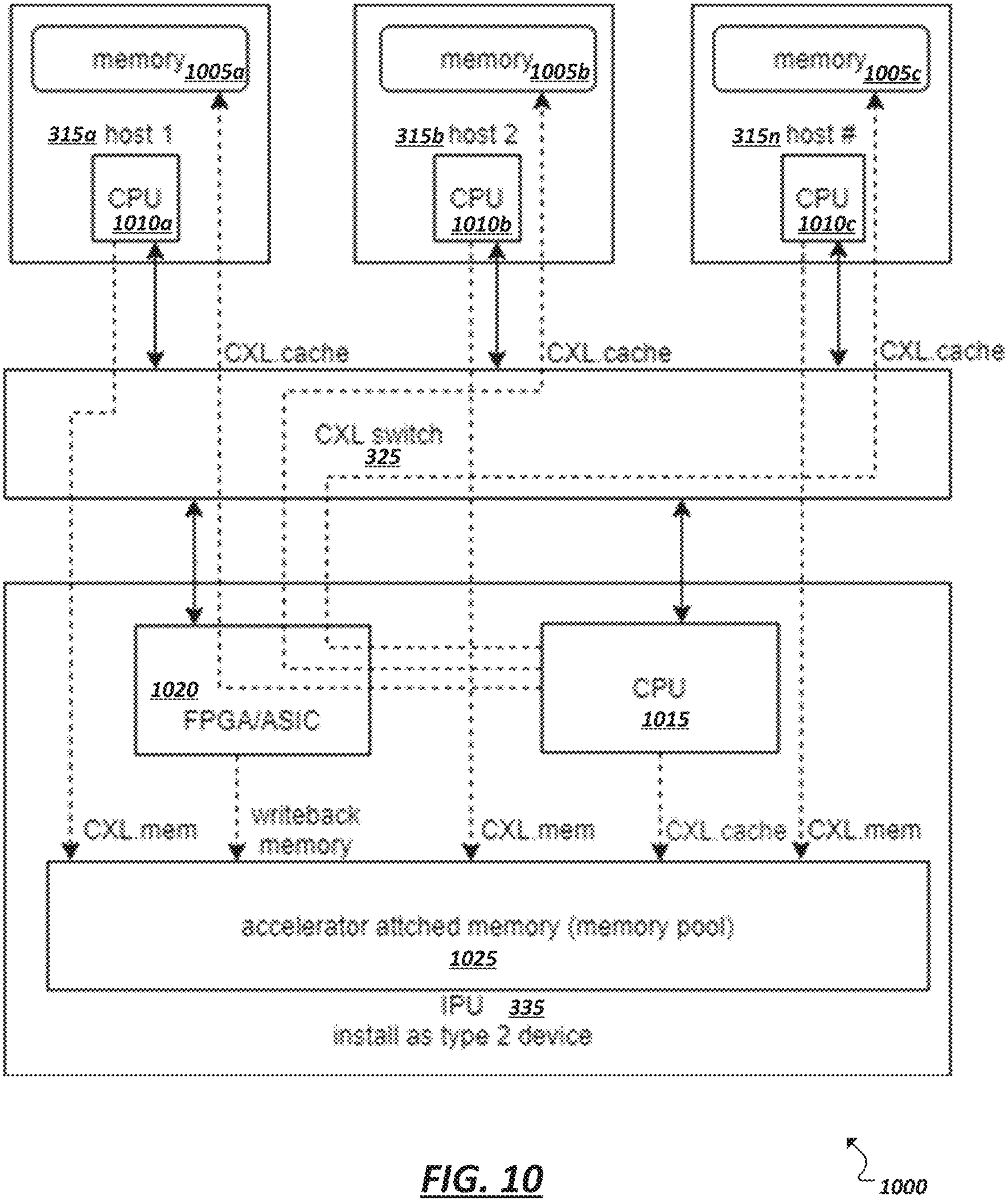
FIG. 10 is a simplified block diagram illustrating data transfers within an example data center cluster architecture.

Turning to FIG. 10, a simplified block diagram 1000 illustrating example hardware blocks of components within a cluster, such as the improved clusters shown in FIGS. 3 and 9. For instance, each host device (e.g., 315*a-n*) may include respective local or attached memory (e.g., 1005*a-c*) as well respective processing hardware 1010*a-c* (e.g., CPU, FPGA, GPU, tensor processing unit (TPU), accelerator hardware, etc.), which may be utilized to host and execute various applications or portions of applications on the corresponding host. Each of the host devices 315*a-c* may be connected to a CXL switch 325 for the cluster. The network processing device 335 of the cluster is also coupled to the switch 325. The network processing device 335 may include both a CPU 1015 and programmable processing block 1020 (e.g., a field programmable gate array (FPGA) or application-specific integrated circuit (ASIC)), together with attached memory 1025, at least a portion of which is designated for use as a memory pool for the cluster.

In one example implementation, the network processing device 335 may be installed as a CXL type 2 device. Accordingly, the CPUs (e.g., 1010*a-c*) of the hosts 315*a-c*, as well as the CPU (e.g., 1015) of the network processing device 335, can cache (e.g., perform cacheable reads and cacheable writes of) the attached memory of the network processing device 335 using the CXL.mem subprotocol. The programmable processing block 1020 of the network processing device 335 may cache the hosts' attached memory (e.g., 1005*a-c*) using the CXL.cache subprotocol. Further, a dedicated hardware channel may be provided between the CPU 1015 and programmable processing block 1020 of the network processing device 335, allowing the CPU 1015 to access the hosts' memories (e.g., 1005*a-c*) through the programmable processing block 1020 (e.g., also using the CXL.cache subprotocol), among other example features and implementations.

Figure 11:
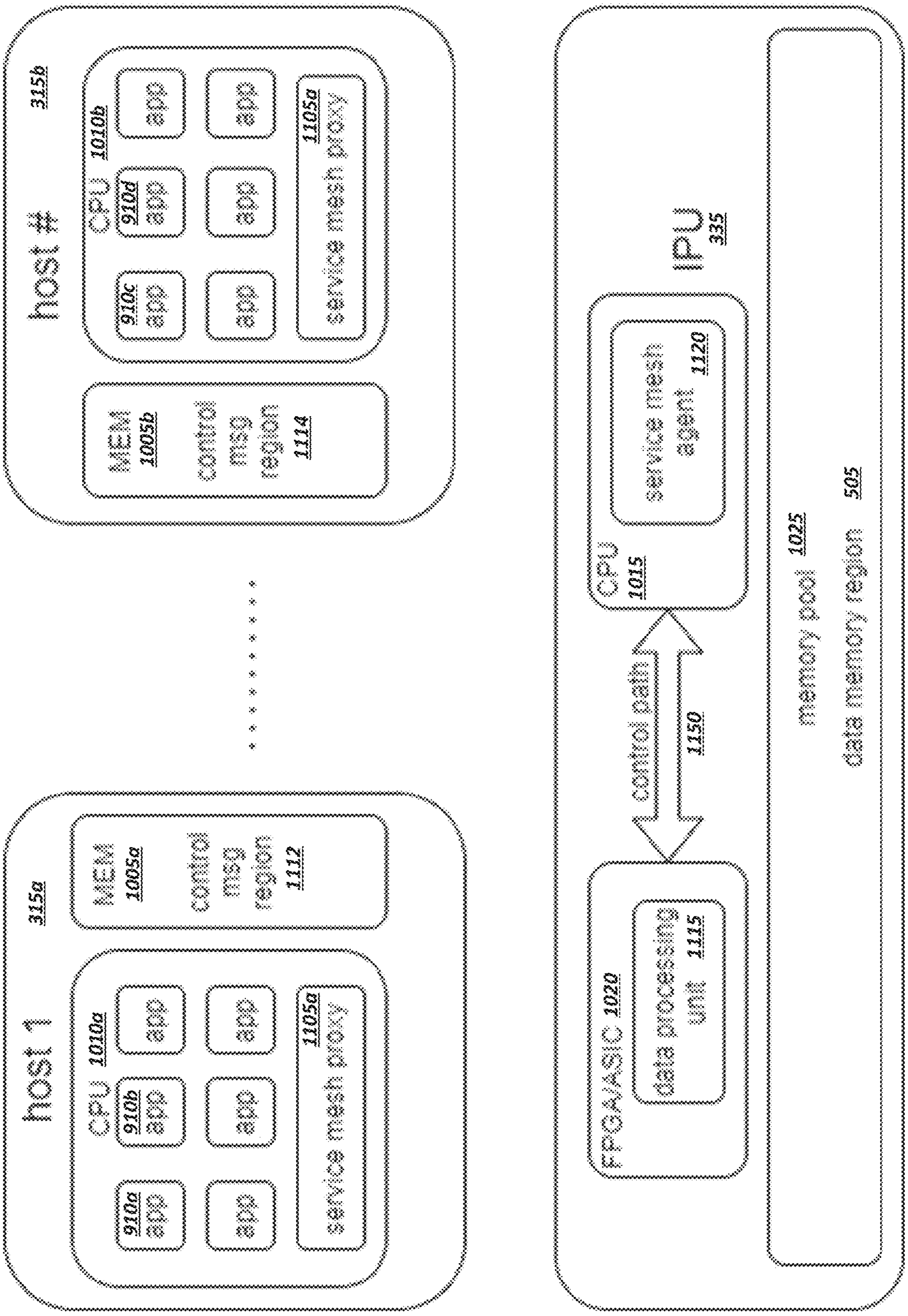
FIG. 11 is simplified block diagram illustrating components of an example data center cluster architecture.

Turning to the simplified block diagram 1100 of FIG. 11, example software blocks utilized in an example implementation of the improved service mesh cluster are shown. In this example, certain host devices (e.g., 315*a*, 315*b*) in the cluster may host a respective collection of software applications or other programs (e.g., 910*a*, 910*c*, etc.). The applications are run on the CPU (e.g., 1010*a*) of the host device (e.g., 315*a*) in traditional user modes. The host devices can further host respective service mesh proxies (e.g., 1105, 1110), and control message regions (e.g., 1112, 1114) may be allocated within the host-device-attached memory (e.g., 1005*a*, 1005*b*), among other example software and memory regions. The service mesh proxy (e.g., 1105*a*) on a host device (e.g., 315*a*) serves as an infrastructure unit resident on the CPU (e.g., 1010*a*), it can intercept all the traffic of the applications (e.g., 910*a-d*), write the outgoing packets into the CXL memory pool, or read the memory from the memory pool 1025 to then notify the applications (e.g., 910*a-d*) of the address(es) of incoming packets. The control message region (e.g., 1112) can reside in the host-attached memory (e.g., 1005*a*). The control message region (e.g., 1112) serves as a communication channel between the host device's service mesh proxy (e.g., 1105*a*) and the network processing device's 335 service mesh agent 1120. For instance, this communication channel may be utilized to allow the service mesh proxy or service mesh agent to each notify the other of new transactions or packets, among other information or events. For instance, the service mesh agent of the network processing device may write control messages into the control message region using CXL.cache memory writes to communicate information to the corresponding service mesh proxy pertaining to the movement of data within the cluster using the memory pool.

In the network processing device 335, data processing logic 1115 is designated for execution within the programmable processing block 1020. Data processing logic 1115 is to manage and maintain the networking connections from/to the network processing block (e.g., with the host devices) and includes encoder/decoder logic for encoding/decoding the packets at the network transport layer (layer 4), as well as moving packets into and out of the shared memory pool. In some implementations, the data processing logic 1115 of the programmable processing block 1020 may provide additional features to assist with networking within and between clusters, including networking features like traffic duplication, rate limiting, and connection management, among others.

The data memory region within the network processing device 335 may be attached to the programmable processing block 1020 and may implement the memory pool (e.g., CXL semantics) within the cluster. This memory region, or pool, is loaded with all data packets handled using the network processing device, allowing other processors or other devices (e.g., hosts 315, 315*b*) within the cluster to access the packets using the CXL-based interconnect interconnecting the network processing device to other devices within the cluster.

The CPU 1015 of the network processing device 335 may execute the service mesh agent 1120 of the network processing device 335. The service mesh agent 1120 may monitor the data memory region implementing the cluster's memory pool 1125 to identify packets loaded into the memory pool. The service mesh agent 1120 may further decode packets identified within the memory pool 1125 at the application layer (level 7) level. For instance, based on the application layer information or metadata within a packet, the service mesh agent 1120 may be executed to make routing decisions, perform load balancing, enforce various policies (e.g., network policies, security policies, data class prioritization, etc.), perform DNS resolution, determine and/o collect statistical information regarding connections within the cluster, as well as access or provide access to logging, tracing, and other information describing performance of the network processing device and/or communications within the cluster. The service mesh agent 1120 of the network processing device 335 also maintains communication with the service mesh proxies (e.g., 1105*a-b*) on the hosts (e.g., 315*a-b*) through the respective control message regions allocated in the host memories (e.g., 1005*a-b*). As introduced above, these communication channels can be used to notify the applications hosted on the host devices of the memory address of the requests so that the applications can access the corresponding data and perform operations thereon via the CXL memory or notify the data processing unit to handle the transferring of corresponding packets, among other example uses. A built-in control path 1150 is also provided coupling the programmable processing block 1020 to the CPU 1015 of the network processing device 335. This control path may be used by the data processing unit 1115 to communicate with the service mesh agent 1120, among other example uses.

Figure 12:
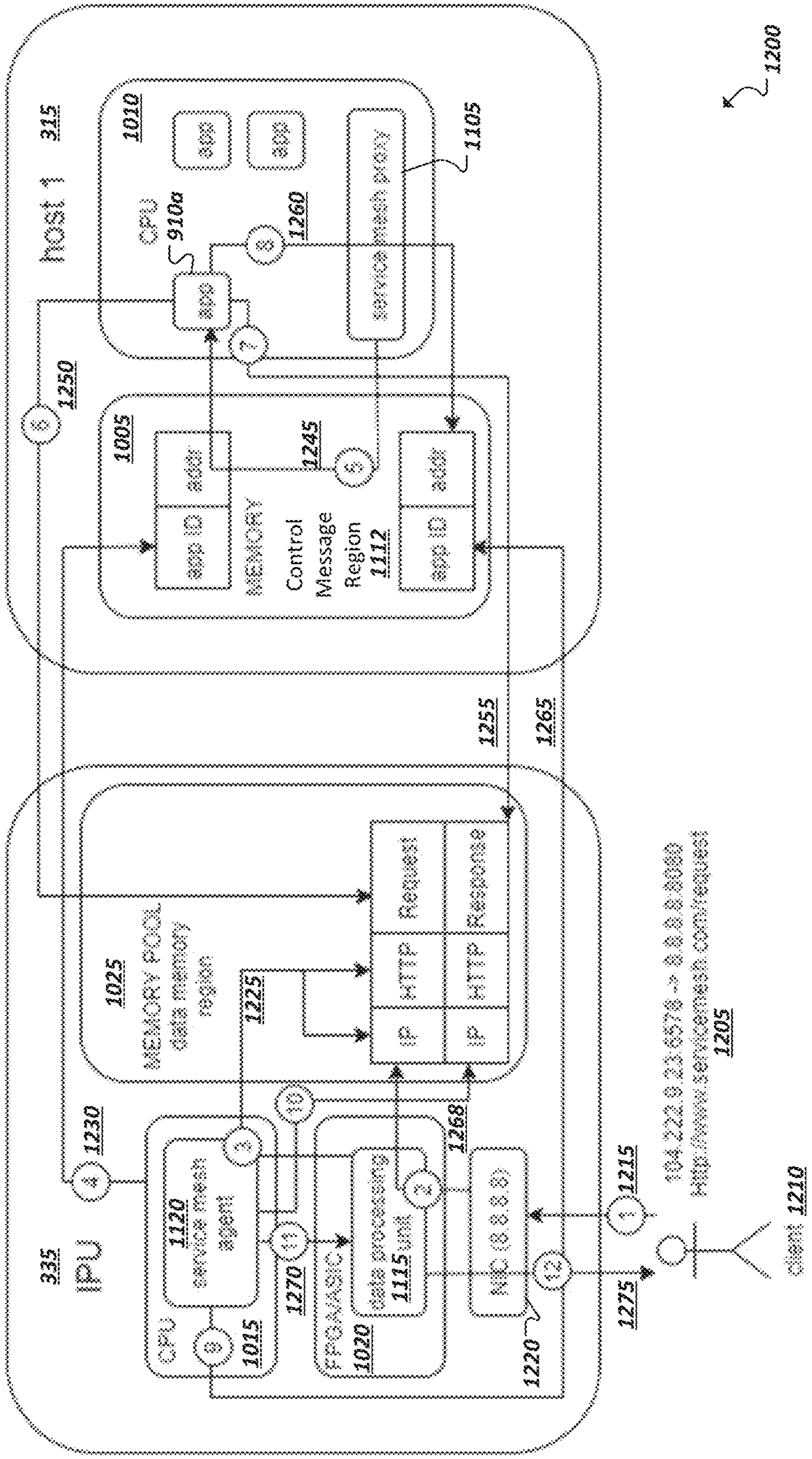
FIG. 12 is a simplified block diagram illustrating a first example transaction in an improved data center cluster

The improved cluster may handle a variety of different transactions and requests. For instance, FIG. 12 is a simplified block diagram 1200 illustrating the workflow involved in the handling of an example HTTP by an improved data center cluster. In one example, the request (e.g., 1205) originates from a source external to the service mesh, such as a user client 1210 (e.g., a browser executed by a smartphone, personal computer, smart display, or other device). In this particular example, the client sends a request URL "www.servicemesh.com/request" with an IP address of 8.8.8.8 (e.g., as determined through a DNS lookup, Layer 7 load balancer, or other mechanism). The client 1210 then sends 1215 the request from its port (e.g., port 6578) out of its IP address (e.g., IP 104.222.9.23) to the network processing device (e.g., 335) associated with the requested address (e.g., IP 8.8.8.8:8080).

Continuing with the example of FIG. 12, the network processing device 335 may receive the request (with the packet arriving at a network interface controller (NIC) 1220 of the network processing device 335). The data processing unit of the network processing device 335 (e.g., executed on a programmable processing block 1020 of the network processing device 335) may check the packet's IP address and determine whether the packet's address falls within the network processing device's (and the corresponding cluster's) scope. If the packet is to be handled by the cluster, the network processing device 335 may accept the TCP connection, handle the overlay tunnel, perform a transport layer security (TLS) handshake if needed, receive the packets, and place the data of the packet into the data memory region in the cluster's memory pool 1025. Upon receipt of the packet and storing the packet data in the memory pool, the data processing unit 1115 may notify the service mesh agent 1120 of the arrival of the packet. Upon being notified, the service mesh agent 1120 may access 1225 the data memory region to access the packet data and check its HTTP header. In some implementations, the service mesh agent holds a full mapping of the cluster (e.g., the host devices, their applications, etc. resident in the cluster) and may utilize this mapping to determine how to route the request to the appropriate host device (e.g., 315) and application container. Upon determining the proper routing of the request, the service mesh agent 1120 may augment the corresponding packet data to insert the target application address (e.g., IP address) into the packet (e.g., to replace the original destination address included in the packet). The service mesh agent may write 1230 a control message to the host's control message region (e.g., with the assistance of the programmable processing block). In one example, the control message region may maintain records for use in efficiently transferring data in the cluster. In one example, the control message region records may include an "app ID" field to indicate an identifier of the target application on the host as well as an "addr" field for the address of the packet (e.g., to be accessed or consumed by that application) within the cluster memory pool 1025.

Continuing with this example, in some implementations, the service mesh proxy of host devices in a cluster may continuously monitor its corresponding control message region 1112 for the presence of messages indicated by records being written to within the control message region, among other example mechanisms. When the service mesh proxy 1105 identifies that a control message has been received, the service mesh proxy utilizes the control message record to identify the application identifier and the address of the corresponding packet within the memory pool 1025. The service mesh proxy 1105 may additionally notify 1245 the application 910*a* that is to consume this packet of the packet's arrival and availability.

The application 910*a*, upon receiving the notification, may access the 1250 packet payload from the memory pool (using CPU 1010) via a CXL.mem read. Additionally, the application 910*a* may request that memory be allocated in the memory pool for its response (e.g., through a memory allocation (malloc) function, where the memory pool is mapped to the host device's (e.g., CPU's) memory space). With the memory allocated in the memory pool 1025, the application may send 1255 a request to write to this location in the memory pool 1025 (via CPU 1010) using a CXL.mem write. The service mesh proxy 1105 of the corresponding host device 315 may intercept 1260 this response and write 1250 the application identifier and the allocated response address in the memory pool 1025 within the control message region 1112 of attached memory 1005. Like the service mesh proxy 1105, the service mesh agent 1120 of the network processing device may continuously monitor the control message region (e.g., using CXL.cache reads) to identify when new responses are ready from applications within the hosts in the cluster. The service mesh agent may identify 1265 the response by the application 910*a* from the control message region 1112 and pull the application identifier and memory pool response address corresponding to the response. Using this information, the service mesh agent 1120 may check 1268 the memory pool address corresponding to the response in the memory pool 1025 to read the contents of the response. For instance, the service mesh agent 1120 may pull the response header and analyze the header information to determine if there are any policies to be applied to the response (e.g., rate limit, circuit breaker, etc.), among other actions. The service mesh agent 1120 may then perform an IP address translation within the draft response header to replace the address with the network processing device's own IP address, among other example modifications of the response header prior to allowing it to be sent. With these modifications and determinations made, the service mesh agent 1120 may notify 1270 the data processing unit 1115 that the response packet is ready to send. The data processing unit 1115 may then send 1275 the response packet back to the client 1210 using a TCP connection.

Figure 13:
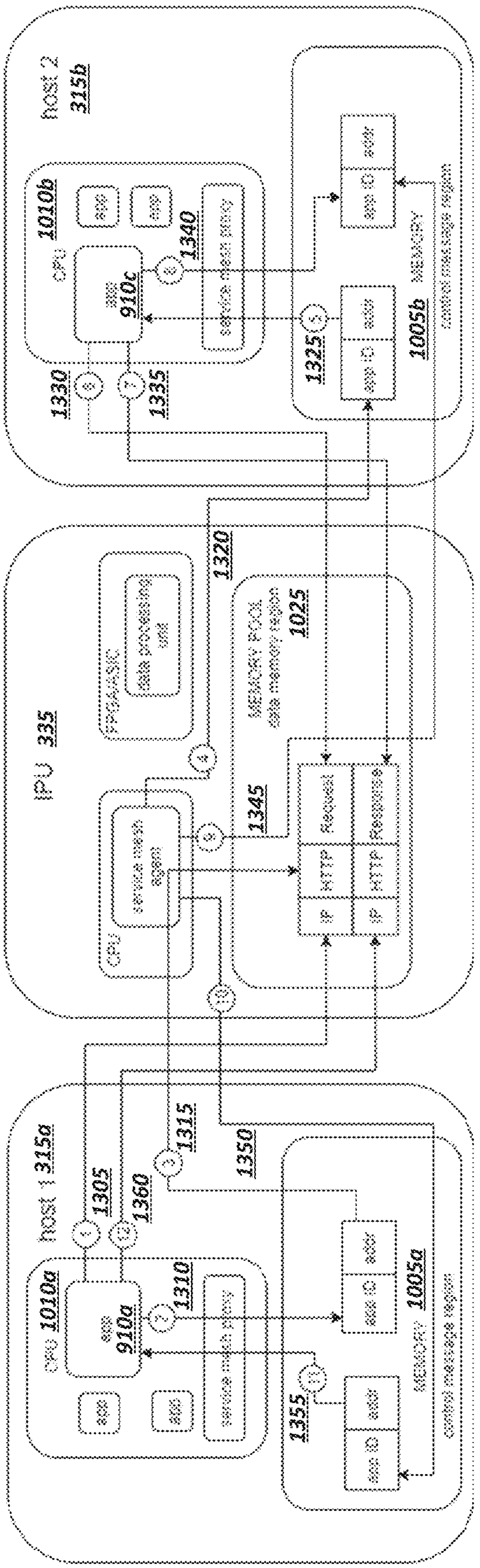
FIG. 13 is a simplified block diagram illustrating a second example transaction in an improved data center cluster.

In another example, illustrated in the simplified block diagram 1300 of FIG. 13, an application-to-application request-response transaction within the same cluster is shown. In this example, a first application 910*a* hosted on a first host device 315*a* is to make a request 1305 to a particular resource (e.g., "www.servicemesh.com/internal"). To make such a request 1305, the application 910*a* allocates 1305 the memory for the request in the memory pool 1025. The service mesh proxy of the host 315*a* of the application 910*a* may store a local mapping of domain names, allowing the corresponding DNS request to be proxied, with the destination IP of the URL being a virtual IP of the service. The application 915*a* may then send the packet out, with the service mesh proxy on its host (e.g., 315*a*) intercepting the packet and setting values 1310 for the application identifier and packet address in the control message region of the memory pool.

Continuing with the example of FIG. 13, the service mesh agent of the network processing device 335 may monitor the control message regions of the various host devices (e.g., 315*a*, 315*b*, etc.) within its cluster to detect when a new message is posted indicating the generation of a request or response by applications executed on the host devices. For instance, the service mesh agent may identify 1315 the new message in the control message region corresponding to the request generated by the application 915*a* and written by the service mesh proxy of host device 315*a*. The service mesh agent may identify the request packet's address in the memory pool 1025 and then access the packet, analyze the HTTP header to determine the destination for the request, and modify the request header with a destination IP address associated with the determined destination. The service mesh agent may also send 1320 a notification message to the destination host's (e.g., 315*b*) control message region (in memory 1005*b*).

Further, the service mesh proxy of the host device 315*b* may likewise continuously monitor its control message region and identify 1325 the arrival of the control message arrived indicating a request packet for one of the applications (e.g., 910*c*) hosted by the host device 315*b*. The service mesh proxy of the host device 315*b* may identify which of its applications the request applies to using the value of the application identifier (app ID) field in the message and further identify the location of the incoming packet in the memory pool using the address field (add) in the message. The service mesh proxy of the host device 315*b* may alert the targeted application 910*c* of the request and the application may initiate a read 1330 of the request from the memory pool 1025 according to the address (add) in the control message. The application 910*c* may consume the payload of the accessed request packet and generate one or more responses based on its use of the request packet data. With the response(s) ready, the application 910*c* may allocate 1335 memory in the memory pool 1025 for the response and send 1340 the corresponding response packet, with the host's 315*b* service mesh proxy intercepting the response and reporting the sending of the response in the control message region of the host device 315*b* so as to alert the service mesh agent of the response.

Continuing with the example of FIG. 13, the service mesh agent of the network processing device 335 may identify 1345 that the service mesh proxy of host device 315*b* has written a new message to the control message region of the host device 315*b* corresponding to the response generated by application 910*c*. The service mesh agent may then identify the location of the response packet (from the control message region record "add" field) and read the packet header to determine whether any policies should be applied to the second of the response. The service mesh agent, upon identifying the response, may send 1350 a control message to the control message region in memory 1005*a* of host device 315*a* to notify the original requesting application 910*a* that a response has been generated and may be obtained from the memory pool 1025. The service mesh proxy of CPU 1010*a* may identify that the control message has been written to the control message region of host device

315*a* and identify, from the control message, that the response corresponds to application 910*a* (from the application identifier field) and can pass the address of the memory pool where the response packet has been posted to the application 910*a*. The application 910*a* may then access/read 1360 the response packet from the memory pool 1025 using the provided address and consume the response data.

Figure 14:
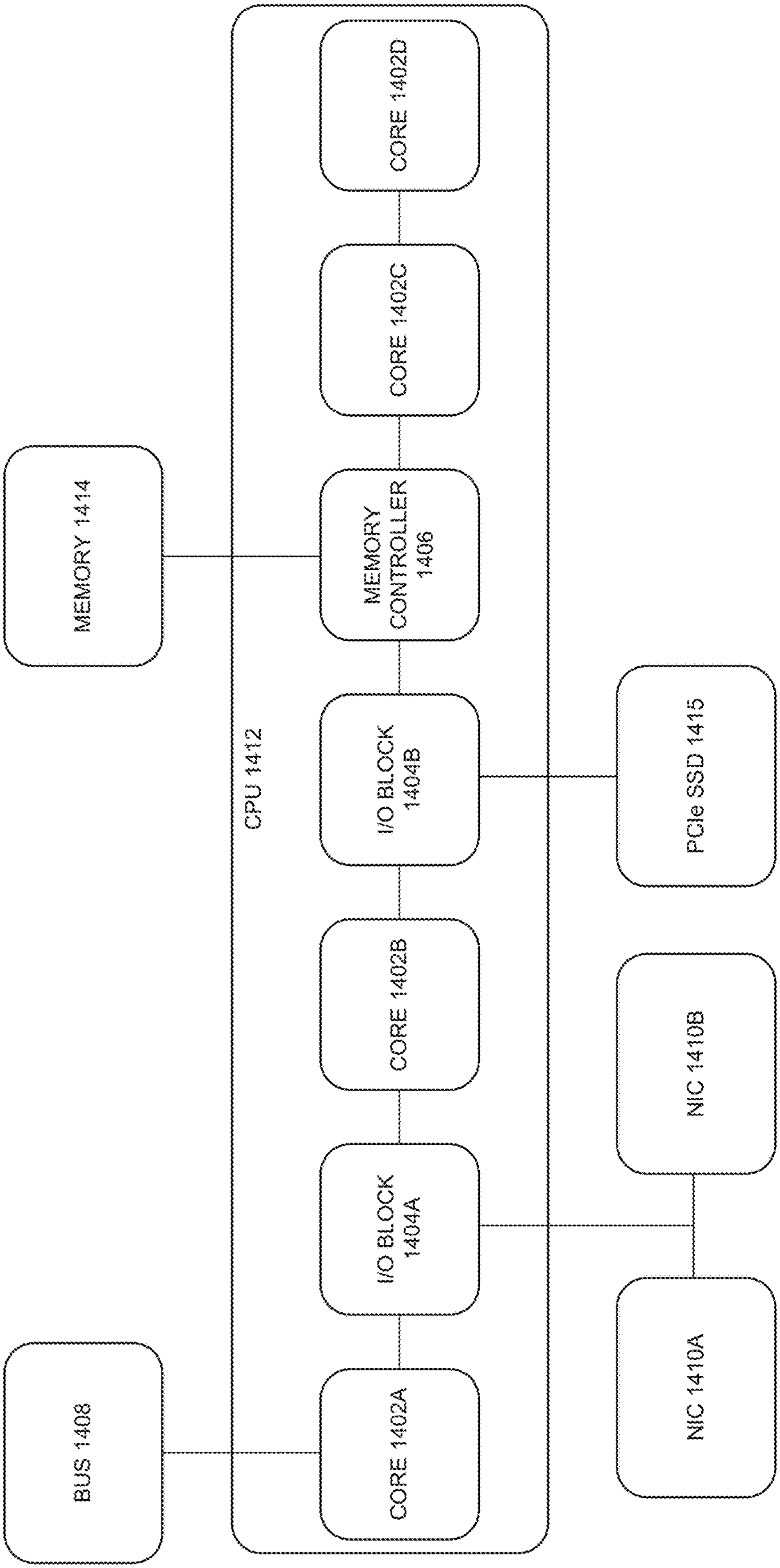
FIG. 14 illustrates a block diagram of an example processor device in accordance with certain embodiments.

FIG. 14 illustrates a block diagram of an example data processor device (e.g., a central processing unit (CPU)) 1412 coupled to various other components of a platform in accordance with certain embodiments. Although CPU 1412 depicts a particular configuration, the cores and other components of CPU 1412 may be arranged in any suitable manner. CPU 1412 may comprise any processor or processing device, such as a microprocessor, an embedded processor, a digital signal processor (DSP), a network processor, an application processor, a co-processor, a system on a chip (SOC), or other device to execute code. CPU 1412, in the depicted embodiment, includes four processing elements (cores 1402 in the depicted embodiment), which may include asymmetric processing elements or symmetric processing elements. However, CPU 1412 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 1412, as illustrated in FIG. 14, includes four cores—cores 1402A, 1402B, 1402C, and 1402D, though a CPU may include any suitable number of cores. Here, cores 1402 may be considered symmetric cores. In another embodiment, cores may include one or more out-of-order processor cores or one or more in-order processor cores. However, cores 1402 may be individually selected from any type of core, such as a native core, a software managed core, a core adapted to execute a native Instruction Set Architecture (ISA), a core adapted to execute a translated ISA, a co-designed core, or other known core. In a heterogeneous core environment (e.g., asymmetric cores), some form of translation, such as binary translation, may be utilized to schedule or execute code on one or both cores.

A core 1402 may include a decode module coupled to a fetch unit to decode fetched elements. Fetch logic, in one embodiment, includes individual sequencers associated with thread slots of cores 1402. Usually a core 1402 is associated with a first ISA, which defines/specifies instructions executable on core 1402. Often machine code instructions that are part of the first ISA include a portion of the instruction (referred to as an opcode), which references/specifies an instruction or operation to be performed. The decode logic may include circuitry that recognizes these instructions from their opcodes and passes the decoded instructions on in the pipeline for processing as defined by the first ISA. For example, as decoders may, in one embodiment, include logic designed or adapted to recognize specific instructions, such as transactional instructions. As a result of the recognition by the decoders, the architecture of core 1402 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 1402, in one embodiment, recognize the same ISA (or a subset thereof). Alternatively, in a heterogeneous core environment, a decoder of one or more cores (e.g., core 1402B) may recognize a second ISA (either a subset of the first ISA or a distinct ISA).

In various embodiments, cores 1402 may also include one or more arithmetic logic units (ALUs), floating point units (FPUs), caches, instruction pipelines, interrupt handling hardware, registers, or other suitable hardware to facilitate the operations of the cores 1402.

Bus 1408 may represent any suitable interconnect coupled to CPU 1412. In one example, bus 1408 may couple CPU 1412 to another CPU of platform logic (e.g., via UPI). I/O blocks 1404 represents interfacing logic to couple I/O devices 1410 and 1415 to cores of CPU 1412. In various embodiments, an I/O block 1404 may include an I/O controller that is integrated onto the same package as cores 1402 or may simply include interfacing logic to couple to an I/O controller that is located off-chip. As one example, I/O blocks 1404 may include PCIe interfacing logic. Similarly, memory controller 1406 represents interfacing logic to couple memory 1414 to cores of CPU 1412. In various embodiments, memory controller 1406 is integrated onto the same package as cores 1402. In alternative embodiments, a memory controller could be located off chip.

As various examples, in the embodiment depicted, core 1402A may have a relatively high bandwidth and lower latency to devices coupled to bus 1408 (e.g., other CPUs 1412) and to NICs 1410, but a relatively low bandwidth and higher latency to memory 1414 or core 1402D. Core 1402B may have relatively high bandwidths and low latency to both NICs 1410 and PCIe solid state drive (SSD) 1415 and moderate bandwidths and latencies to devices coupled to bus 1408 and core 1402D. Core 1402C would have relatively high bandwidths and low latencies to memory 1414 and core 1402D. Finally, core 1402D would have a relatively high bandwidth and low latency to core 1402C, but relatively low bandwidths and high latencies to NICs 1410, core 1402A, and devices coupled to bus 1408.

"Logic" (e.g., as found in I/O controllers, power managers, latency managers, etc. and other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: a network processing device including: an interface to couple to a plurality of host devices in a data center cluster via an interconnect, where the interface is compliant with a Compute Express Link (CXL)-based protocol; a processor device; a memory, where at least a portion of the memory is for use as a memory pool for the data center cluster; a service mesh agent, executable by the processor device, to: identify a request packet, where the request packet is to be stored at an address in the memory pool; determine that request packet includes a request associated with an application hosted by a particular one of the plurality of host devices; indicate to the particular host device that the request packet is stored at the address in the memory pool; identify that the application has prepared a response packet associated with the request and written the response packet to another address in the memory pool; and facilitate transportation of the response packet from the network processing device to a destination computing device.

Example 2 includes the subject matter of example 1, where: the service mesh agent is further to: write a control message in a control message region of memory of the particular host device to indicate to the particular host device that the request packet is stored at the address in the memory pool, where the control message further identifies that the request packet is to be associated with the application; and read another control message in the control message region to identify that the application has prepared the response packet, where the other control message identifies that the response packet has been written to the other address in the memory pool, and the other control message was written to the control message region by the particular host device.

Example 3 includes the subject matter of example 2, where reads and writes to the control message region and memory pool include CXL reads and CXL writes respectively.

Example 4 includes the subject matter of example 3, where the control message is written to the control message region using a CXL.cache write, the response packet is written to the other address in the memory pool using a CXL.mem write, and the other control message is read using a CXL.cache read.

Example 5 includes the subject matter of any one of examples 1-4, where the network processing device further includes another interface to couple to a network outside the data center cluster.

Example 6 includes the subject matter of example 5, where the network processing device is to couple to another network processing device of another data center cluster via the other interface.

Example 7 includes the subject matter of any one of examples 5-6, where the destination computing device includes a computing device outside the data cluster, the request packet originates from the destination computing device, and the network processing device is to write the request packet to the address in the memory pool and send the response packet to the destination computing device over a network.

Example 8 includes the subject matter of example 7, where the network processing device further includes: a data processing unit to: receive the request packet; write the request packet to the memory pool; notify the service mesh agent that the request packet has been written to the memory pool; and send the response packet to the destination computing device over the network.

Example 9 includes the subject matter of example 8, where the network processing device further includes a programmable processor and the data processing unit is executed by the programmable processor.

Example 10 includes the subject matter of example 9, where the network processing device further includes a network interface card (NIC).

Example 11 includes the subject matter of any one of examples 8-10, where the data processing unit is further to manage communications between the data center cluster and other data center clusters on the network.

Example 12 includes the subject matter of any one of example 1, where the request packet is generated by another application hosted by another one of the plurality of host devices in the data center cluster, the other host device writes the request packet to the address in the memory pool, and the response packet is read from the memory pool by the other host device to transport the response packet to the other host device.

Example 13 includes the subject matter of any one of examples 1-12, where network processing device is coupled to the plurality of host devices using CXL links.

Example 14 includes the subject matter of example 13, where the where network processing device is coupled to the plurality of host devices using a CXL switch.

Example 15 includes the subject matter of any one of examples 1-14, where the host devices in the plurality of host devices access the memory pool using a CXL.mem subprotocol, and the network processing device accesses attached memory of the plurality of host devices using a CXL.cache subprotocol Example 16 is at least one non-transitory machine-readable storage medium with instructions stored thereon, the instructions executable to cause a machine to: write a request packet to a location within a memory pool of a network processing device, where the request packet was received from a computing device, and the network processing device manages connections within a data center cluster and is coupled to a plurality of host devices within the data center cluster; determine that the request packet is intended for a particular application hosted by a particular one of the plurality of host devices; write a control message from the network processing device to attached memory of the particular host device to indicate an address of the location in the memory pool; read, at the network processing device, another control message in the attached memory of the particular host device, where the other control message identifies that a response packet has been generated by the particular application to the request packet and written to another location within the memory pool, and the other control message identifies another address in the memory pool corresponding to the other location; and participate, using the network processing device, in delivery of the response packet to the computing device.

Example 17 includes the subject matter of example 16, where writes to the memory pool by the particular host device, writes to the attached memory by the network processing device, and reads of the attached memory by the network processing device are according to a Compute Express Link (CXL)-based protocol.

Example 18 includes the subject matter of any one of examples 16-17, where network processing device is coupled to the plurality of host devices using CXL links.

Example 19 includes the subject matter of example 18, where the where network processing device is coupled to the plurality of host devices using a CXL switch.

Example 20 includes the subject matter of any one of examples 16-19, where the network processing device is further to manage communications between the data center cluster and other data center clusters on the network.

Example 21 includes the subject matter of any one of examples 16-20, where the request packet is generated by another application hosted by another one of the plurality of host devices in the data center cluster, the other host device writes the request packet to the address in the memory pool, and the response packet is read from the memory pool by the other host device to transport the response packet to the other host device.

Example 22 includes the subject matter of example 21, where the instructions are further executable to cause the machine to write another control message from the network processing device to attached memory of the other host device to indicate the other address in the memory pool where the response packet is written to the other host device.

Example 23 includes the subject matter of any one of examples 16-20, where the computing device includes a computing device outside the data center cluster.

Example 24 is a method including: writing a request packet to a location within a memory pool of a network processing device, where the request packet was received from a computing device, and the network processing device manages connections within a data center cluster and is coupled to a plurality of host devices within the data center cluster; determining that the request packet is intended for a particular application hosted by a particular one of the plurality of host devices; writing a control message from the network processing device to attached memory of the particular host device to indicate an address of the location in the memory pool; reading, at the network processing device, another control message in the attached memory of the particular host device, where the other control message identifies that a response packet has been generated by the particular application to the request packet and written to another location within the memory pool, and the other control message identifies another address in the memory pool corresponding to the other location; and participating, using the network processing device, in delivery of the response packet to the computing device.

Example 25 includes the subject matter of example 24, where writes to the memory pool by the particular host device, writes to the attached memory by the network processing device, and reads of the attached memory by the network processing device are according to a Compute Express Link (CXL)-based protocol.

Example 26 includes the subject matter of any one of examples 24-25, where network processing device is coupled to the plurality of host devices using CXL links.

Example 27 includes the subject matter of example 26, where the where network processing device is coupled to the plurality of host devices using a CXL switch.

Example 38 includes the subject matter of any one of examples 24-27, where the network processing device is further to manage communications between the data center cluster and other data center clusters on the network.

Example 29 includes the subject matter of any one of examples 24-28, where the request packet is generated by another application hosted by another one of the plurality of host devices in the data center cluster, the other host device writes the request packet to the address in the memory pool, and the response packet is read from the memory pool by the other host device to transport the response packet to the other host device.

Example 30 includes the subject matter of example 29, further including writing another control message from the network processing device to attached memory of the other host device to indicate the other address in the memory pool where the response packet is written to the other host device.

Example 31 includes the subject matter of any one of examples 24-30, where the computing device includes a computing device outside the data center cluster.

Example 32 is a system including means to perform the method of any one of examples 24-31.

Example 33 is a system including: a plurality of host systems; a switch coupled to the plurality of host systems; and a network processing device communicatively coupled to the plurality of host systems via the switch, where the network processing device includes: a processor device; a memory, where at least a portion of the memory is for use as a memory pool for a data center cluster including the plurality of host systems; a service mesh agent, executable by the processor device, to: identify a request packet, where the request packet is to be stored at an address in the memory pool; determine that request packet includes a request associated with an application hosted by a particular one of the plurality of host devices; indicate to the particular host device that the request packet is stored at the address in the memory pool; identify that the application has prepared a response packet associated with the request and written the response packet to another address in the memory pool; and facilitate transportation of the response packet to a destination computing device.

Example 34 includes the subject matter of example 33, where the switch includes a switch compatible with a Compute Express Link (CXL) protocol, and the memory pool is based on the CXL protocol.

Example 35 includes the subject matter of any one of examples 33-34, where the particular host device includes an attached memory, a processor, and a service mesh proxy executable by the processor to: identify in a control message region of the attached memory a message written by the network processing device to indicate that the request packet is stored at the address in the memory pool; identify a write of the response packet to the memory pool by the application; and write another message in the control message region to identify to the network processing unit that the response packet has been written to the other address in the memory pool.

Example 36 includes the subject matter of any one of examples 33-35, where the host devices in the plurality of host devices access the memory pool using a CXL.mem subprotocol, and the network processing device accesses attached memory of the plurality of host devices using a CXL.cache subprotocol.

Example 37 includes the subject matter of any one of examples 33-36, where the network processing device further includes an interface to couple to another network processing device, where the other network processing devices manages connections within another data center cluster.

Example 38 includes the subject matter of any one of examples 33-37, where the data center cluster includes a service mesh cluster.

Example 39 includes the subject matter of any one of 33-38, where the destination computing device includes a computing device outside the data cluster, the request packet originates from the destination computing device, and the network processing device is to write the request packet to the address in the memory pool and send the response packet to the destination computing device over a network.

Example 40 includes the subject matter of example 39, where the network processing device further includes: a data processing unit to: receive the request packet; write the request packet to the memory pool; notify the service mesh agent that the request packet has been written to the memory pool; and send the response packet to the destination computing device over the network.

Example 41 includes the subject matter of example 40, where the network processing device further includes a programmable processor and the data processing unit is executed by the programmable processor.

Example 42 includes the subject matter of example 41, where the network processing device further includes a network interface card (NIC).

Example 43 includes the subject matter of any one of examples 40-42, where the data processing unit is further to manage communications between the data center cluster and other data center clusters on the network.

Example 44 includes the subject matter of any one of examples 33-43, where: the service mesh agent is further to: write a control message in a control message region of memory of the particular host device to indicate to the particular host device that the request packet is stored at the address in the memory pool, where the control message further identifies that the request packet is to be associated with the application; and read another control message in the control message region to identify that the application has prepared the response packet, where the other control message identifies that the response packet has been written to the other address in the memory pool, and the other control message was written to the control message region by the particular host device.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:

a network processing device comprising:

- a first interface to couple to a network connection;
- a second interface to couple to a plurality of host devices in a data center cluster via an interconnect, wherein the second interface is compliant with a Compute Express Link (CXL)-based protocol;
- network interface controller circuitry to manage communication on the network connection;
- a processor device;
- a memory of the network processing device, wherein at least a portion of the memory is for use as a memory pool for the data center cluster, and the plurality of host devices are to access the memory pool via the second interface;
- a service mesh agent, executable by the processor device, to:
  - identify a request packet, wherein the request packet is to be stored at an address in the memory pool;
  - determine that the request packet comprises a request associated with an application hosted by a particular one of the plurality of host devices;
  - write, through the CXL-based protocol via the second interface, a first control message to a control message region in memory of the particular host device to indicate to the particular host device that the request packet is associated with the application and stored at the address in the memory pool;
  - monitor, through the CXL-based protocol via the second interface, the control message region to identify that the application has prepared a response packet associated with the request and written the response packet to another address in the memory pool; and facilitate transportation of the response packet from the network processing device to a destination computing device via the network connection.

2. The apparatus of claim 1, wherein: the service mesh agent is further to:

read another control message in the control message region to identify that the application has prepared the response packet, wherein the other control message identifies that the response packet has been written to the other address in the memory pool, and the other control message was written to the control message region, via the second interface, by the particular host device.

3. The apparatus of claim 2, wherein reads and writes to the control message region and memory pool comprise CXL reads and CXL writes respectively.

4. The apparatus of claim 3, wherein the control message is written to the control message region using a CXL.cache write, the response packet is written to the other address in the memory pool using a CXL.mem write, and the other control message is read using a CXL.cache read.

5. The apparatus of claim 1, wherein the network connection couples the network processing device to a network outside the data center cluster.

6. The apparatus of claim 5, wherein the network processing device is to couple to another network processing device of another data center cluster via the network connection and the first interface.

7. The apparatus of claim 5, wherein the destination computing device comprises a computing device outside the data cluster, the request packet originates from the destination computing device, and the network processing device is to write the request packet to the address in the memory pool and send the response packet to the destination computing device over a network.

8. The apparatus of claim 7, wherein the network processing device further comprises:

a data processing unit to:

receive the request packet;

write the request packet to the memory pool;

notify the service mesh agent that the request packet has been written to the memory pool; and send the response packet to the destination computing device over the network.

9. The apparatus of claim 8, wherein the network processing device further comprises a programmable processor and the data processing unit is executed by the programmable processor.

10. The apparatus of claim 9, wherein the network processing device further comprises a smart network interface card (NIC).

11. The apparatus of claim 8, wherein the data processing unit is further to manage communications between the data center cluster and other data center clusters on the network.

12. The apparatus of claim 1, wherein the request packet is generated by another application hosted by another one of the plurality of host devices in the data center cluster, the other host device writes the request packet to the address in the memory pool, and the response packet is read from the memory pool by the other host device to transport the response packet to the other host device.

13. At least one non-transitory machine-readable storage medium with instructions stored thereon, the instructions executable to cause a machine to:

write a request packet to a location within a memory pool of a data center cluster, wherein the location comprises an internal memory of a network processing device, the request packet was received from a computing device, and the network processing device manages connections within the data center cluster and facilitates access of the data center cluster to an external network, wherein the network processing device is coupled to a plurality of host devices within the data center cluster, and the plurality of host devices are to access the memory pool via a Compute Express Link (CXL)-based interface of the network processing device;

determine that the request packet is intended for a particular application hosted by a particular one of the plurality of host devices;

write, based on a CXL-based protocol via the CXL-based interface, a control message from the network processing device to attached memory of the particular host device to indicate an address of the location in the memory pool;

read, based on the CXL-based protocol at the network processing device and via the CXL-based interface, another control message in the attached memory of the particular host device, wherein the other control message identifies that a response packet has been generated by the particular application to the request packet and written to another location within the memory pool, and the other control message identifies another address in the memory pool corresponding to the other location; and participate, using the network processing device, in delivery of the response packet to the computing device.

14. The storage medium of claim 13, wherein writes to the memory pool by the particular host device are according to the CXL-based protocol.

15. A system comprising:

a plurality of host systems;

a switch coupled to the plurality of host systems; and a network processing device communicatively coupled to the plurality of host systems via the switch, wherein the network processing device comprises:

a processor device;

a memory of the network processing device, wherein at least a portion of the memory is for use as a memory pool for a data center cluster comprising the plurality of host systems, the network processing device, and the switch;

network interface controller circuitry to manage communication on the network connection;

a first interface to couple to at least one other data center cluster via a network;

a second interface compliant with a Compute Express Link (CXL)-based protocol, wherein the plurality of host devices are to access the memory pool via the second interface; and a service mesh agent, executable by the processor device, to:

identify a request packet, wherein the request packet is to be stored at an address in the memory pool;

determine that the request packet comprises a request associated with an application hosted by a particular one of the plurality of host devices;

write, via the second interface, a control message to a control message region in memory of the particular host device to indicate to the particular host device that the request packet is associated with the application and stored at the address in the memory pool;

read, via the second interface, the control message region to identify that the application has prepared a response packet associated with the request and written the response packet to another address in the memory pool via the second interface; and facilitate transportation of the response packet to a destination computing device.

16. The system of claim 15, wherein the switch comprises a switch compatible with the CXL-based protocol, and the memory pool is based on the CXL-based protocol.

17. The system of claim 15, wherein the particular host device comprises an attached memory, a processor to execute at least a portion of the application, and a service mesh proxy executable by the processor to:

identify in the control message region of the attached memory the control message written by the network processing device to indicate that the request packet is stored at the address in the memory pool;

identify a write of the response packet to the memory pool by the application via the second interface; and write another message in the control message region to identify to the network processing unit that the response packet has been written to the other address in the memory pool.

18. The system of claim 15, wherein the host devices in the plurality of host devices access the memory pool using a CXL.mem subprotocol, and the network processing device accesses attached memory of the plurality of host devices using a CXL.cache subprotocol.

19. The system of claim 15, wherein the destination computing device is in the other data center cluster.

20. The system of claim 15, wherein the data center cluster comprises a service mesh cluster.

* * * * *